United States Patent
Zhou et al.

(10) Patent No.: US 12,112,550 B2
(45) Date of Patent: Oct. 8, 2024

(54) SYSTEMS AND METHODS FOR TRAFFIC LIGHT DETECTION

(71) Applicant: MOTIONAL AD LLC, Boston, MA (US)

(72) Inventors: Lubing Zhou, Clementi (SG); Jiong Yang, Jurong West (SG); Ankit Dhall, Zurich (CH)

(73) Assignee: Motional Ad LLC, Boston, MA (US)

(*) Notice: Subject to any disclaimer, the term of this patent is extended or adjusted under 35 U.S.C. 154(b) by 396 days.

(21) Appl. No.: 17/129,661

(22) Filed: Dec. 21, 2020

(65) Prior Publication Data

US 2021/0211568 A1 Jul. 8, 2021

Related U.S. Application Data

(60) Provisional application No. 62/958,065, filed on Jan. 7, 2020.

(51) Int. Cl.
| | |
|---|---|
| *G06V 20/58* | (2022.01) |
| *G06V 10/25* | (2022.01) |
| *G08G 1/0962* | (2006.01) |
| *H04N 23/71* | (2023.01) |
| *H04N 23/743* | (2023.01) |

(52) U.S. Cl.
CPC ............ *G06V 20/584* (2022.01); *G06V 10/25* (2022.01); *G08G 1/09623* (2013.01); *H04N 23/71* (2023.01); *H04N 23/743* (2023.01)

(58) Field of Classification Search
None
See application file for complete search history.

(56) References Cited

U.S. PATENT DOCUMENTS

| | | | |
|---|---|---|---|
| 8,559,673 | B2 | 10/2013 | Fairfield et al. |
| 9,145,140 | B2 | 9/2015 | Ferguson et al. |
| 10,332,401 | B2 | 6/2019 | Zruya et al. |

(Continued)

FOREIGN PATENT DOCUMENTS

| | | |
|---|---|---|
| CN | 102176287 A | 9/2011 |
| CN | 106886757 A | 6/2017 |

(Continued)

OTHER PUBLICATIONS

Almagambetov A, Velipasalar S, Baitassova A. Mobile standards-based traffic light detection in assistive devices for individuals with color-vision deficiency. IEEE Transactions on Intelligent Transportation Systems. Oct. 21, 2014;16(3):1305-20. (Year: 2014).*

(Continued)

*Primary Examiner* — Clifford Hilaire
(74) *Attorney, Agent, or Firm* — Knobbe, Martens, Olson & Bear, LLP

(57) ABSTRACT

This disclosure describes the use of optical sensors to detect and characterize the state of traffic lights to assist with the navigation of autonomous vehicles. In particular, a specific optical configuration is shown that includes both a fixed-exposure sensor and an auto-exposure sensor. Imagery from the two sensor types can be combined to more accurately characterize the state of traffic signals at any particular intersection. Systems and methods for analyzing only select regions of the imagery captured by the traffic light detection system are also described.

20 Claims, 18 Drawing Sheets

(56) References Cited

U.S. PATENT DOCUMENTS

| | | | |
|---|---|---|---|
| 10,339,400 B1* | 7/2019 | Chai | B60R 1/00 |
| 10,699,142 B2 | 6/2020 | Wisniowski et al. | |
| 11,915,492 B2 | 2/2024 | Xia | |
| 2009/0303077 A1* | 12/2009 | Onome | G08G 1/096791 |
| | | | 348/148 |
| 2010/0033571 A1* | 2/2010 | Fujita | G06V 20/584 |
| | | | 348/149 |
| 2013/0253754 A1* | 9/2013 | Ferguson | G06V 20/584 |
| | | | 701/28 |
| 2017/0262709 A1* | 9/2017 | Wellington | G06V 10/764 |
| 2017/0355375 A1 | 12/2017 | Ferguson et al. | |
| 2018/0012088 A1 | 1/2018 | Matsuo et al. | |
| 2018/0041721 A1 | 2/2018 | Lewkow et al. | |
| 2018/0211530 A1 | 7/2018 | Sarkar et al. | |
| 2018/0336692 A1* | 11/2018 | Wendel | G06V 10/147 |
| 2019/0197729 A1* | 6/2019 | Liang | G06T 7/75 |
| 2019/0302789 A1 | 10/2019 | Miura et al. | |

FOREIGN PATENT DOCUMENTS

| | | |
|---|---|---|
| EP | 3324384 A1 | 5/2018 |
| JP | 2013-242686 A | 12/2013 |
| WO | WO 2018/213092 A1 | 11/2018 |
| WO | WO 2019/133177 A1 | 7/2019 |

OTHER PUBLICATIONS

Barnes, D. et al., "Exploiting 3D semantic scene priors for online traffic light interpretation", 2015 IEEE Intelligent Vehicles Symposium (IV), Jun. 28-Jul. 1, 2015, COEX, Seoul, Korea, in 6 pages.
SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
Great Britain Office Action issued for Application No. GB 2100090.6, dated Aug. 6, 2021.
Great Britain Office Action issued for Application No. GB 2100090.6, dated May 9, 2022.
Great Britain Office Action issued for Application No. GB 2218541.7, dated Aug. 2, 2023.
Korean Office Action issued for Application No. KR 10-2021-0001548, dated Dec. 19, 2022.
Korean Office Action issued for Application No. KR 10-2021-0001548, dated Jun. 29, 2023.
Chinese Office Action issued for Application No. CN 202110016703.3 dated Jan. 10, 2024.

* cited by examiner

SYSTEMS AND METHODS FOR TRAFFIC LIGHT DETECTION

CROSS-REFERENCE TO RELATED APPLICATIONS

This application claims the benefit of U.S. Provisional Patent Application No. 62/958,065, filed Jan. 7, 2020, entitled "SYSTEMS AND METHODS FOR TRAFFIC LIGHT DETECTION," the entire contents of which are hereby incorporated by reference.

FIELD

This description relates to a computer system for detecting and characterizing the state of one or more traffic signals in the environment ahead of an autonomous vehicle.

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects, traffic signs and traffic signals in the surroundings.

SUMMARY

The subject matter described in this specification is directed to a computer system and techniques for detecting and characterizing the state of traffic lights positioned in front of an autonomous vehicle. Generally, the computer system is configured to receive input from one or more sensors of the vehicle, detect one or more traffic lights in the environment forward of the vehicle based on the received input, and operate the vehicle based upon the characterized state of the traffic lights.

In particular, systems and methods for detecting and characterizing the state of traffic lights are discussed in detail. A method for performing traffic light detection and characterization includes the following: capturing an image using a sensor coupled to an autonomous vehicle; obtaining, using a processing circuit, data (e.g. GPS data) representing a location of the autonomous vehicle at the time the image was captured; obtaining, using the processing circuit, data representing a location of a traffic light; selecting, using the processing circuit, a portion of the image that includes the traffic light based on the obtained location of the traffic light and the obtained location of the autonomous vehicle (e.g., the location of the traffic light relative to the location of the autonomous vehicle); determining, using the processing circuit, a state of the traffic light by analyzing the selected portion of the image (e.g., without analyzing the non-selected portion of the image to determine a state of a traffic light); and operating, by a control circuit, the autonomous vehicle in accordance with the determined state of the traffic light.

In some embodiments, the method also includes prior to selecting the portion of the image, correlating the obtained location of the traffic light relative to the obtained position of the autonomous vehicle with a location in the image. Selecting the portion of the image includes determining a size of the selected portion of the image based on a distance between the autonomous vehicle and the traffic light. The size of the selected portion is inversely proportional to the distance between the autonomous vehicle and the traffic light. The selection process is also performed upon subsequently captured images where the selected portions of the subsequently captured images are selected based on locations of the autonomous vehicle relative to the traffic light at the time of capture of each subsequently captured image.

In some embodiments, the method also includes selecting a second portion of the image that includes another traffic light. The selection of the second portion is based on an obtained location of another traffic light and the obtained location of the autonomous vehicle. The method continues analyzing the second portion of the image to determine a state of the other traffic light. The control circuit of the autonomous vehicle then navigates the autonomous vehicle in accordance with the determined state of the traffic light and the determined state of the other traffic light. In some embodiments, the method also includes determining whether the state of the traffic light matches the other traffic light match. A match can increase the confidence of the autonomous vehicle in the state of the traffic lights.

In some embodiments, determining the state of the traffic light includes determining a color and a shape of a light emitted by the traffic light that is positioned within the selected portion of the image. For example, the determined state of the traffic light can be a yellow arrow. Possible states of the traffic light include at least a green, red or yellow circle or a green, red or yellow arrow with a left, right or upward direction. Due to color variation and sensor capabilities yellow tends to be the color that is the most difficult to accurately detect. Further, arrows are more difficult to accurately detect than circles.

In some embodiments, a traffic light database can be used to help determine a direction of one or more arrows by comparing the known direction of arrows for the traffic signal with the pattern of light detected in the captured image. For example, if the processing circuit is unable to determine whether the arrow is a left green arrow or an up green arrow and the traffic light database indicates only left and right arrows are present at the intersection, then the processing circuit can identify the state as a left arrow.

In some embodiments, one of the tasks taken by the processing circuit is determining a confidence level associated with the determined state of the traffic light. Confidence levels falling below a threshold level are disregarded and assumed to be unknown. Above the threshold level the state is passed to the control circuit which is then able to consider the traffic light state when navigating the autonomous vehicle. The confidence of the determined state of the traffic light can be affected by how closely an area of the image occupied by the detected light emitted by the traffic light is to an expected area of the image occupied by the light. This size metric could help avoid a bad state determination where a vehicle's tail lights are positioned between the autonomous vehicle and the traffic light.

In some embodiments the sensor is a first optical sensor and the image is a first image and the method further comprises: capturing a second image using a second optical sensor; and selecting, using the processing circuit, a portion of the second image that includes the traffic light. Determining the state of the traffic light includes analyzing the selected portion of the second image.

In some embodiments, the first optical sensor is a fixed-exposure sensor and the second optical sensor is an auto-exposure sensor. Operating parameters of the first optical sensor have values well suited for detecting an average amount of illumination emitted by a traffic light. The operating parameters suitable for configuring the values to achieve a desired exposure include aperture, exposure time/shutter speed and ISO.

In some embodiments, the image is a first image captured at a first distance from the traffic light and the selected portion of the first image is a first portion. The method also includes: capturing a second image at a second distance from the traffic light, the second distance being shorter than the first distance; and selecting a second portion of the second image, the second portion being larger than the first portion such that a first ratio of a height of the traffic signal to a height of the first portion in the first image being about the same as a second ratio of a height of the traffic signal to a height of the second portion in the second image.

In some embodiments, a height of the selected portion of the image is greater than a width of the selected portion of the image. The narrower width can be helpful in reducing the number of traffic lights captured within a single image since traffic lights are ordinarily distributed horizontally. The larger height dimension may also be useful where a sensor accuracy is lower vertically than horizontally. An aspect ratio of the selected portion of the image is fixed. In a particular embodiment the aspect ratio can be ⅔ (width/height). For the width (w) of selected image region, it is depended on the depth distance d from the traffic light to the camera. Using the triangular equation: w=s*r*f/d, where r is the traffic light bulb radius, f is camera focal length, d is depth distance of traffic light w.r.t. camera, and s is a well-tuned fixed parameter to determine how much background portion to be included in the cropped image.

A height of the selected portion of the image is based on historical data showing an accuracy of a predicted location of the traffic light within the image. A size of the selected portion of the image is based on an estimated accuracy of a predicted location of the traffic light within the image, where the estimated accuracy is based on historical data generated from previously captured images.

In some embodiments, the height of the selected portion of the image is greater than the width of the selected portion of the image when an estimated accuracy of a vertical location of the traffic light in the image is lower than an estimated accuracy of a horizontal location of the traffic light in the image. Vertical position variation can be less precise due to issues with vertical stabilization of the vehicle and since the vertical position of the traffic light can change more rapidly than the horizontal position as the autonomous vehicle approaches the traffic light.

The described method can be implemented by a non-transitory computer-readable storage medium storing instructions configured to be executed by one or more circuits of an autonomous vehicle or by a processor of the autonomous vehicle executing coded instructions.

Another method associated with traffic light detection includes capturing images with a sensor tuned for the average illumination input of a traffic light. In particular, the method includes capturing, using a first sensor having a fixed exposure configuration, a first image including a traffic light. A fixed exposure configuration is one in which settings of the sensor are fixed regardless of an amount of light being emitted from within a field of view covered by the sensor, i.e., settings generally refer to shutter speed, aperture and ISO. The method also includes capturing, using a second sensor having an auto exposure configuration. An auto-exposure configuration is one in which settings of the sensor are changed based on an amount of light being emitted from within a field of view covered by the sensor to achieve a desired image exposure. Settings for the auto-exposure configuration such as shutter speed, aperture and ISO are continuously changed to achieve a desired exposure for the amount of ambient light. The method continues by determining, using a processing circuit, a state of the traffic light by analyzing the first image and the second image; and operating, using a control circuit, the autonomous vehicle in accordance with the determined state of the traffic light.

In some embodiments operating parameters of the first sensor have fixed values well-suited for detecting an average illumination intensity of the traffic light while in other embodiments the values are able to change modulate. If for example a higher or lower ISO is desired the aperture and shutter speed can be adjusted to maintain the desired exposure level. In some embodiments, the first sensor can have different exposure levels in the day and night.

In some embodiments, a first field of view of the first sensor is different than and overlaps with a second field of view of the second sensor. A focal length of the first sensor can be different than a focal length of the second sensor. In some sensor configurations, the second sensor is positioned forward of and below the first sensor relative to the autonomous vehicle.

In some embodiments, the processing circuit analyzes second image to identify a moving object allowing the second sensor to act as both a traffic light sensor and an object detection sensor.

In some embodiments, operating the autonomous vehicle in accordance with the determined state of the traffic light includes stopping the autonomous vehicle in accordance with the determined state of the traffic light being a red circle or a red arrow.

In some embodiments, the sensor configuration can include both the second sensor and a third sensor having an auto exposure configuration for determining a location of one or more objects. Like the second sensor the third sensor can also be used to determine a status of a traffic light. At least half of a field of view of the second sensor can be positioned outside of a field of view of the third sensor, thereby increasing a coverage area of the two sensors.

In some embodiments, the method also includes: selecting portions of the first and second images that include the traffic light. Furthermore, analyzing the first image and the second image includes analyzing only the selected portions of the first and second images.

In some embodiments and in accordance with a determination that the selected portions of the first and second images include a plurality of lights, the method further includes determining a light of the plurality of lights to be the traffic light, the determination of which of the plurality of lights is the traffic light being based more on readings from the second sensor than readings from the first sensor. One typical example of using the auto-exposure camera is to distinguish s red-circle traffic light from a vehicle tail light. This is helpful since sometimes only the lights are clearly visible in imagery captured by the fixed-exposure camera, making the background (vehicle body or traffic light box housing) hard to see clearly. The imagery generated by the auto-exposure camera includes extra background context that adds extra cues to allow the processing circuit to separate these confusing cases.

In some embodiments, determining the state of the traffic light comprises distinguishing a first light emitted by the traffic light from a second light emitted by another light source by referencing an expected location of the first light within the first and second images.

In some embodiments, analyzing the first image and the second image comprises analyzing only a first portion of the first image and a second portion of the second image, wherein the first light and the second light are visible in the first portion of the first image and the second portion of the second image.

In some embodiments, the autonomous vehicle comprises a third sensor configured to capture images of traffic lights located outside a field of view of the second sensor, and wherein the processing circuit is configured to use imagery provided by the third sensor to determine a state of the traffic lights captured by the third sensor.

In some embodiments, the first sensor and the second sensor have fixed focus optics and digital sensors capable of detecting visible light. The first and second sensors can be incorporated into video cameras capable of capturing imagery at a rate of at least 24 frames per second. In some embodiments, the first sensor and the second sensor are forward facing sensors with fields of view covering an angle of at least 30 degrees centered on a forward end of the autonomous vehicle. In some embodiments, the processing circuit includes a neural network that determines the state of the traffic light.

The described method can be implemented by a non-transitory computer-readable storage medium storing instructions configured to be executed by one or more circuits of an autonomous vehicle or by a processor of the autonomous vehicle executing coded instructions.

These and other aspects, features, and implementations can be expressed as methods, apparatuses, systems, components, program products, means or steps for performing a function, and in other ways.

These and other aspects, features, and implementations will become apparent from the following descriptions, including the claims.

DETAILED DESCRIPTION

Figure 1:
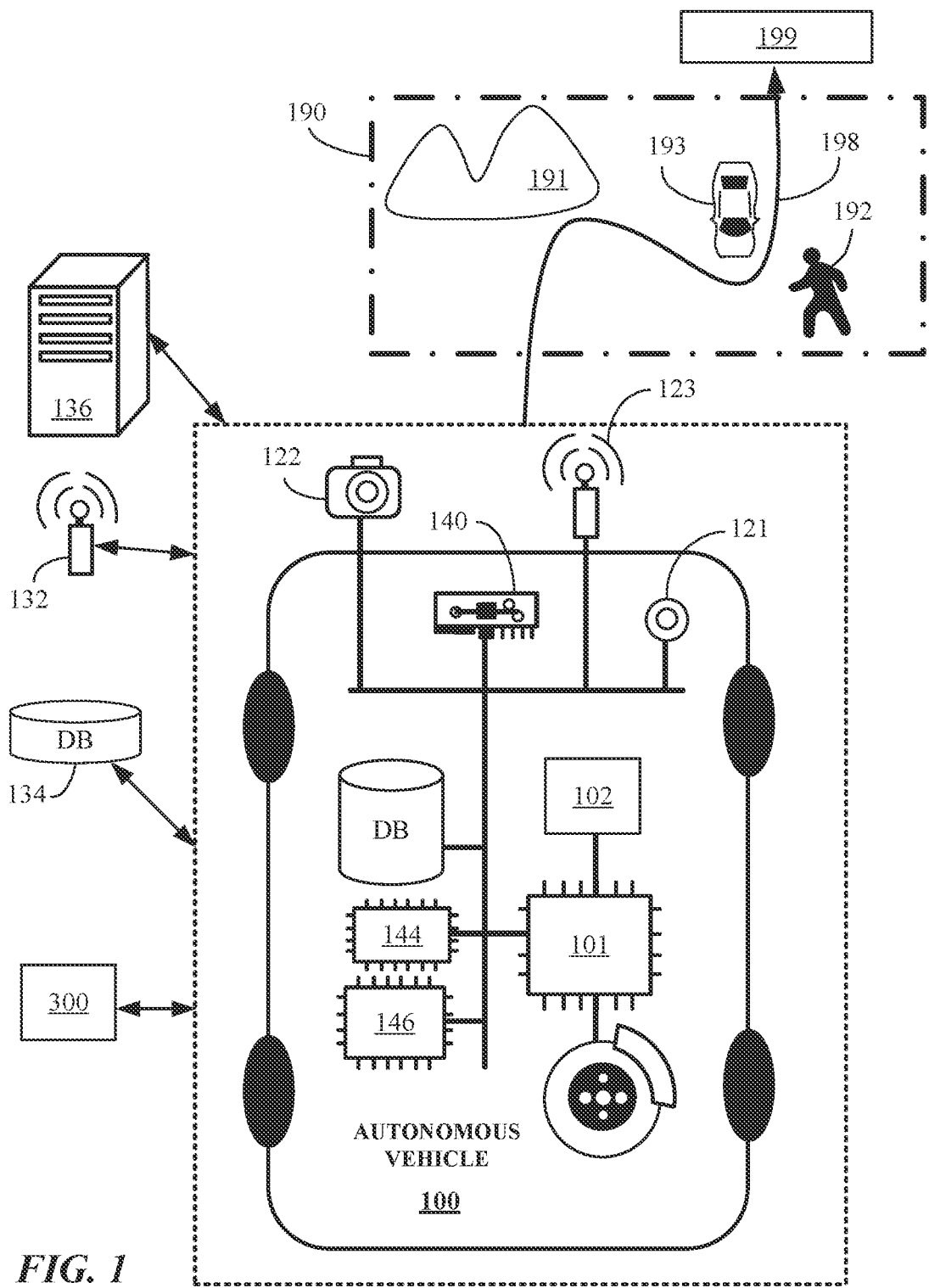
FIG. 1 shows an example of an autonomous vehicle having autonomous capability.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Computing System for Object Detection Using Pillars
8. Example Point Clouds and Pillars
9. Example Process for Detecting Objects and Operating the Vehicle Based on the Detection of the Objects General Overview Autonomous vehicles driving in complex environments (e.g., an urban environment) pose a great technological challenge. In order for autonomous vehicles to navigate these environments, the vehicles detect various types of objects such as traffic lights, vehicles, pedestrians, and bikes in real-time using sensors such as cameras, LIDAR and/or RADAR. One approach for performing object detection on image inputs is deep learning. However, the sparsity of sensor inputs (e.g., LIDAR point clouds) makes existing image-based deep learning techniques computationally inefficient. The disclosed embodiments include a system and techniques for efficiently and quickly detecting traffic lights based on imagery producing sensors as well as systems and techniques that implement two or more optical sensors with different exposure configurations for detecting and characterizing the state of traffic lights surrounding the autonomous vehicle.

In particular, the imagery captured by the sensors associated with the traffic signal detection system can be selectively cropped leaving only regions of the imagery that includes a particular traffic signal. In this way, the likelihood of identifying an illumination pattern emitted something other than a traffic signal as a traffic signal is greatly reduced. Car head lights, tail lights and electronic billboards are all examples of lights that might be confused with a traffic signal. In some embodiments, the traffic light detection system includes both a fixed exposure sensor called a traffic light detection sensor and an auto-exposure sensor associated with the object detection system. The traffic light detection sensor has fixed settings that maintain an exposure level well suited for detecting an amount of light normally emitted by a traffic signal.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to a second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless specified otherwise.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 200 described below with respect to FIG. 2.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
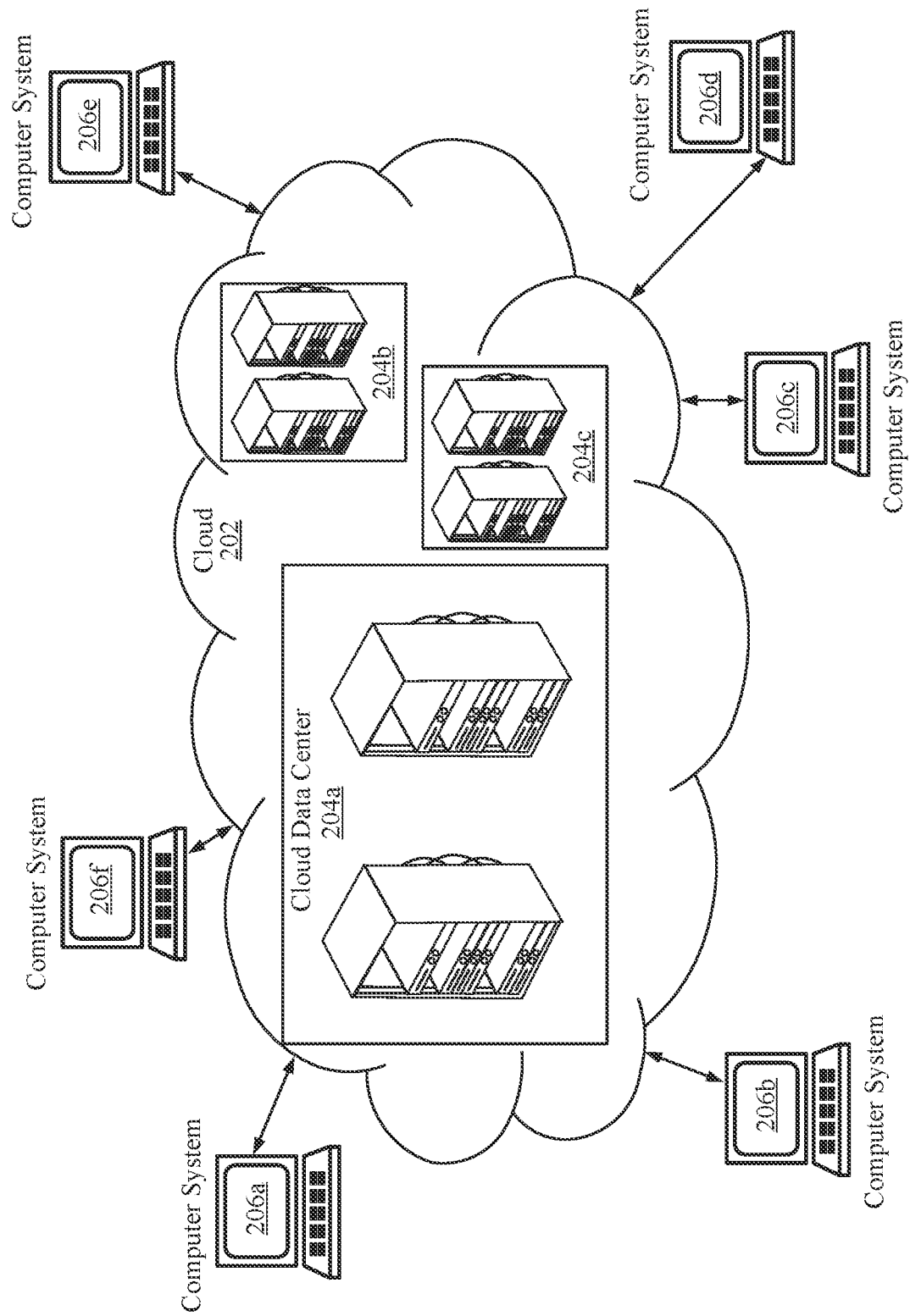
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g., networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Figure 3:
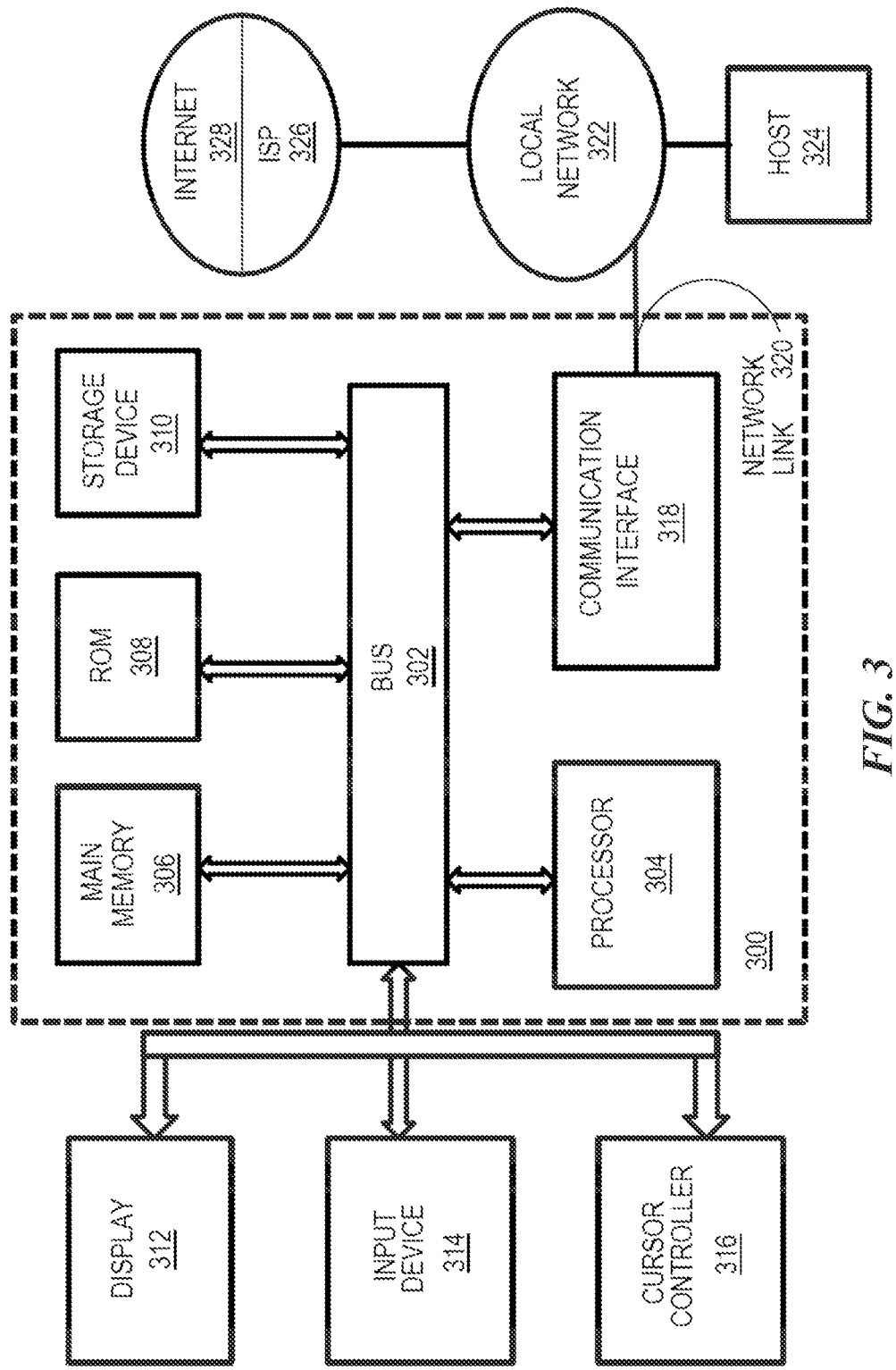
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
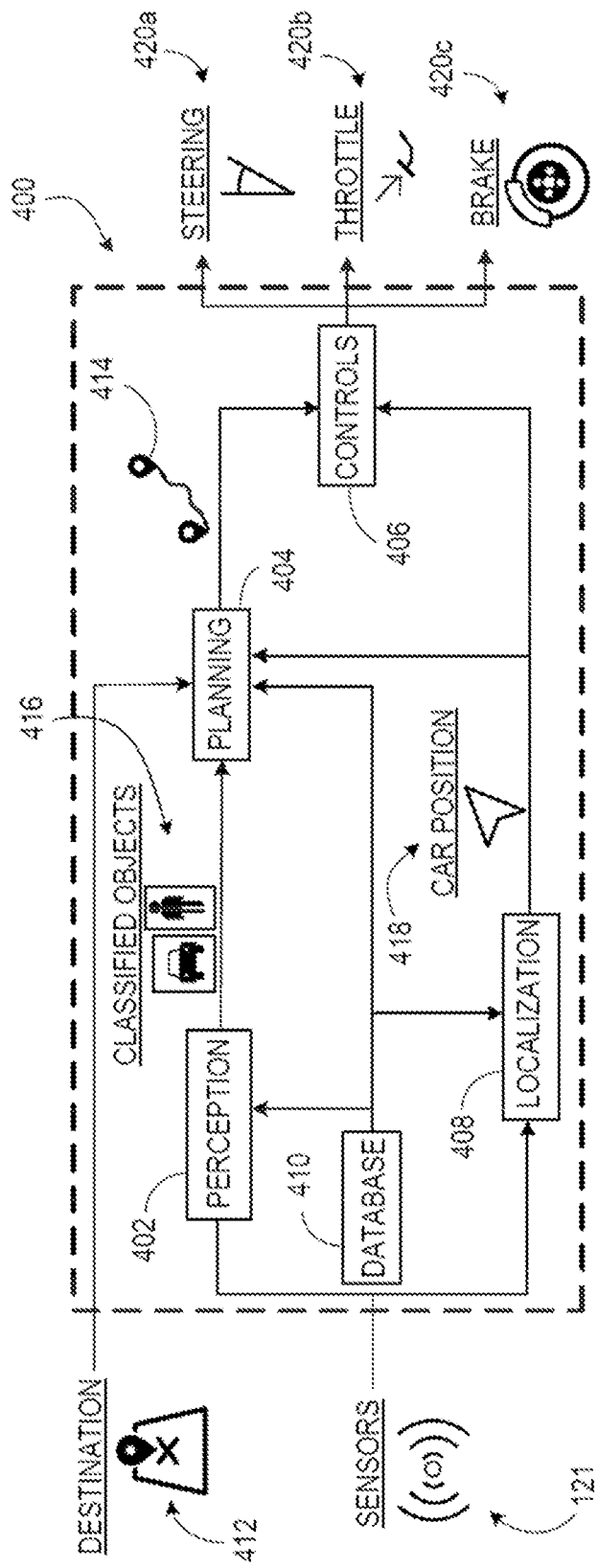
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
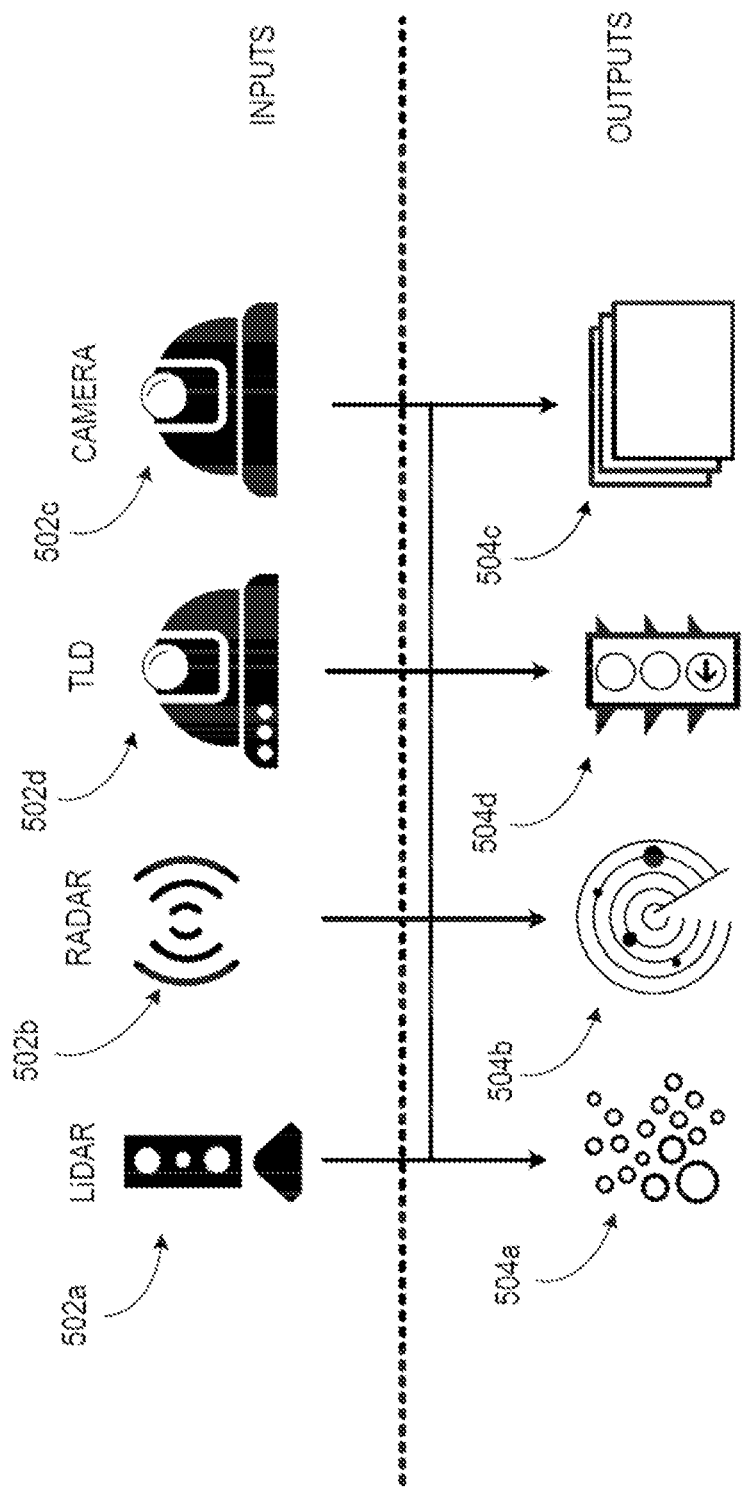
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

Figure 6:
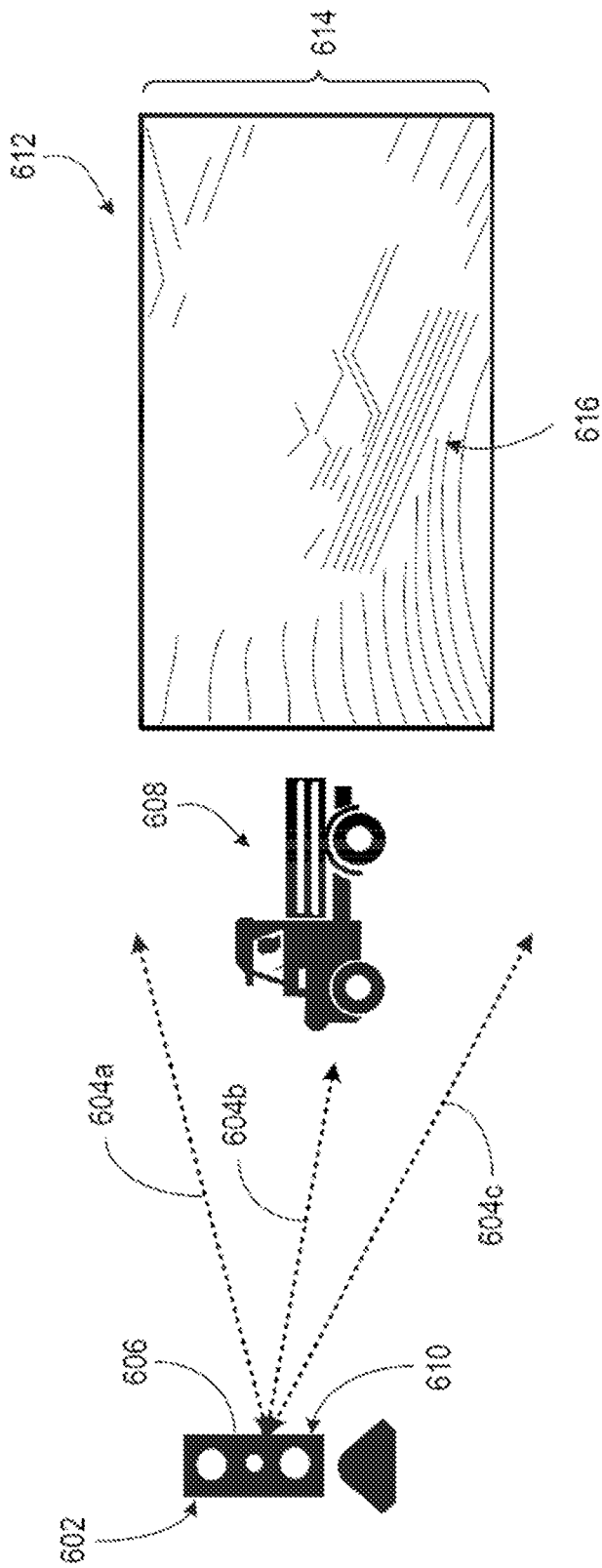
FIG. 6 shows an example of a LiDAR system.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
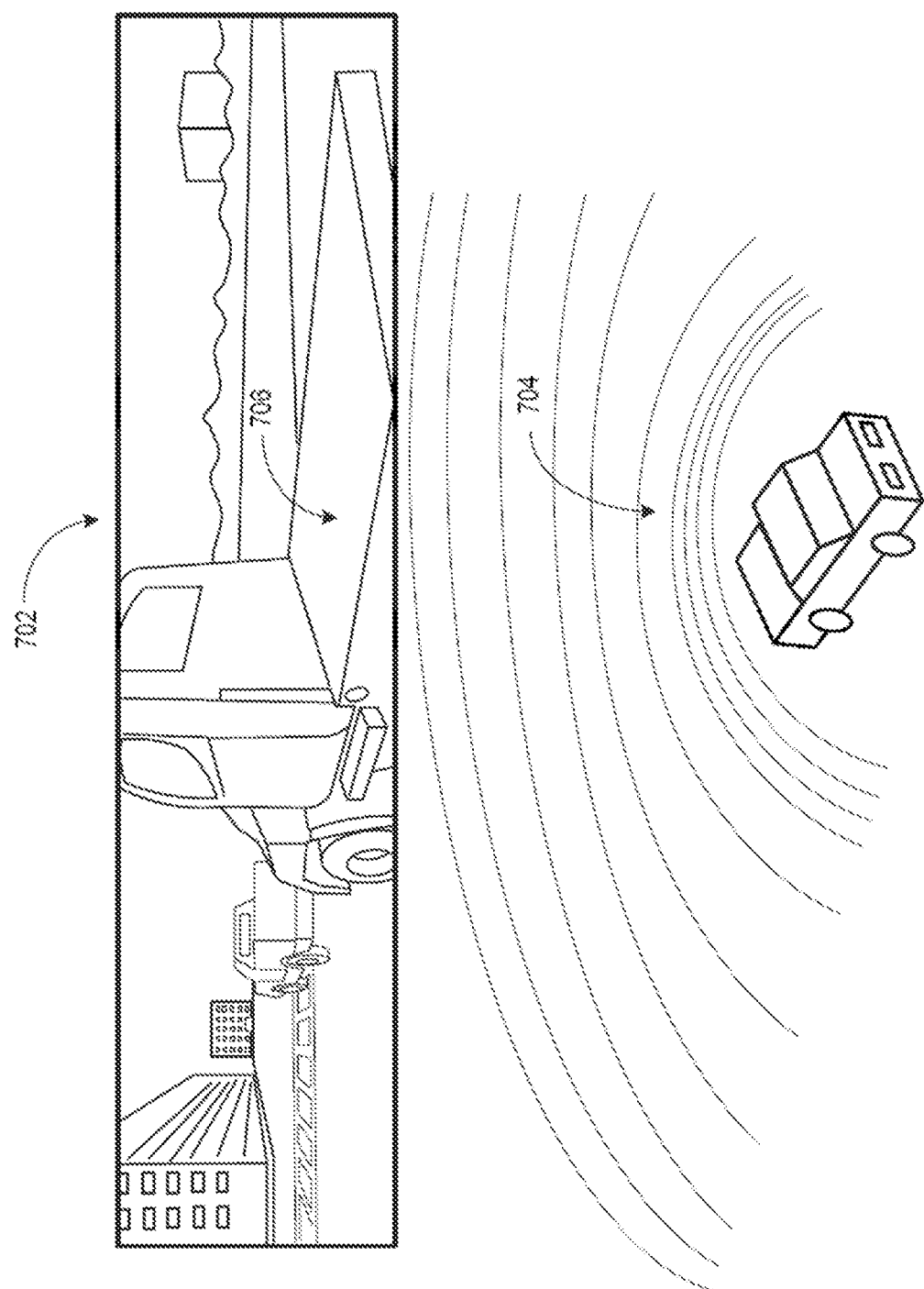
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
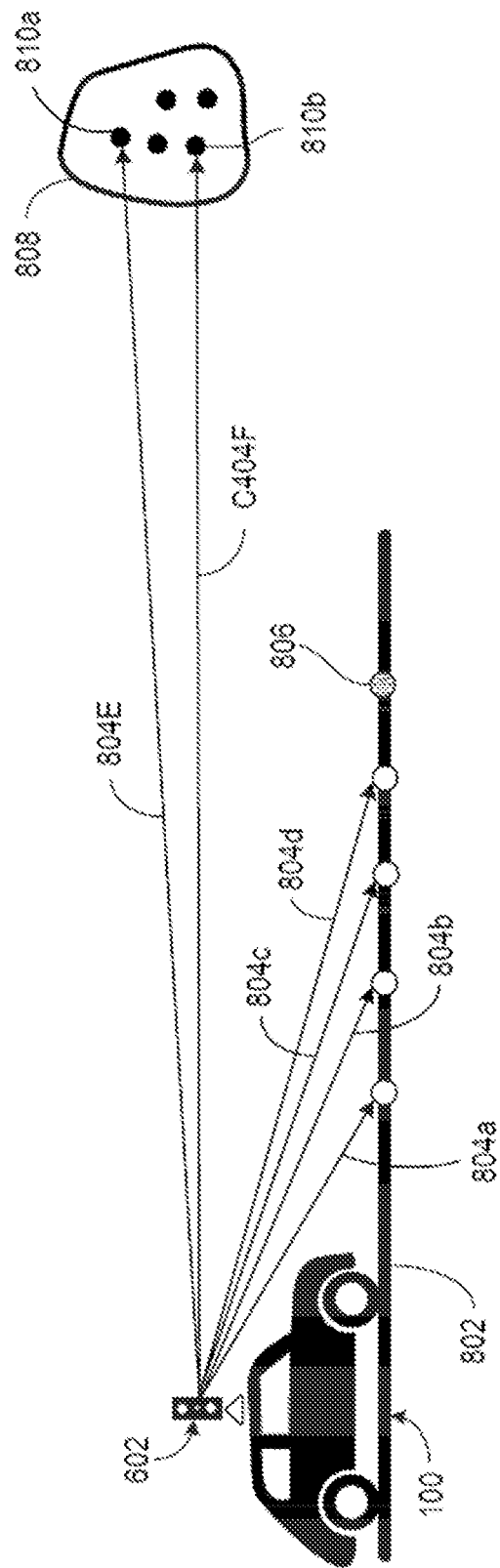
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
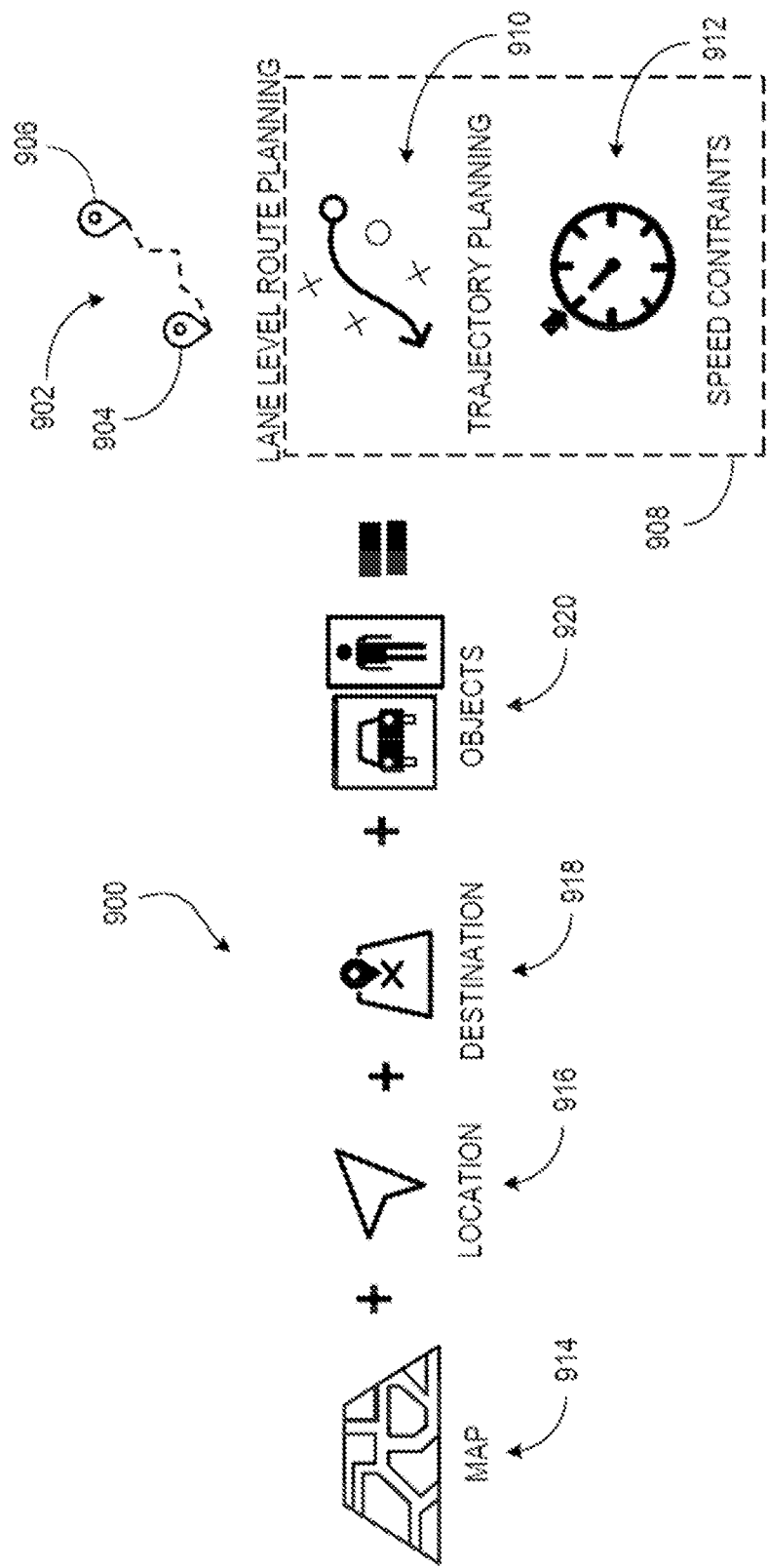
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
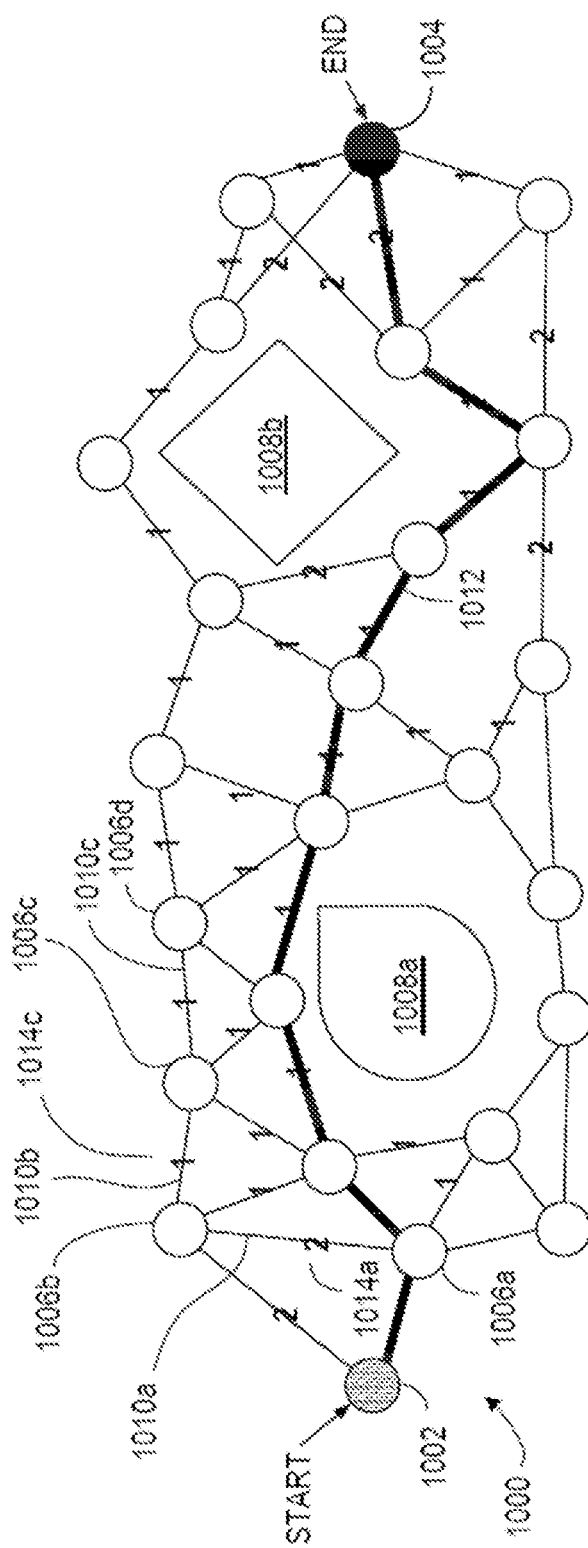
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006a-d representing different locations between the start point 1002 and the end point 1004 that could be occupied by an AV 100. In some examples, e.g., when the start point 1002 and end point 1004 represent different metropolitan areas, the nodes 1006a-d represent segments of roads. In some examples, e.g., when the start point 1002 and the end point 1004 represent different locations on the same road, the nodes 1006a-d represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006a-d are distinct from objects 1008a-b which cannot overlap with a node. In an embodiment, when granularity is low, the objects 1008a-b represent regions that cannot be traversed by automobile, e.g., areas that have no streets or roads. When granularity is high, the objects 1008a-b represent physical objects in the field of view of the AV 100, e.g., other automobiles, pedestrians, or other entities with which the AV 100 cannot share physical space. In an embodiment, some or all of the objects 1008a-b are a static objects (e.g., an object that does not change position such as a street lamp or utility pole) or dynamic objects (e.g., an object that is capable of changing position such as a pedestrian or other car).

The nodes 1006a-d are connected by edges 1010a-c. If two nodes 1006a-b are connected by an edge 1010a, it is possible for an AV 100 to travel between one node 1006a and the other node 1006b, e.g., without having to travel to an intermediate node before arriving at the other node 1006b. (When we refer to an AV 100 traveling between nodes, we mean that the AV 100 travels between the two physical positions represented by the respective nodes.) The edges 1010a-c are often bidirectional, in the sense that an AV 100 travels from a first node to a second node, or from the second node to the first node. In an embodiment, edges 1010a-c are unidirectional, in the sense that an AV 100 can travel from a first node to a second node, however the AV 100 cannot travel from the second node to the first node. Edges 1010a-c are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a*-*c* has an associated cost 1014*a*-*b*. The cost 1014*a*-*b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a*-*b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
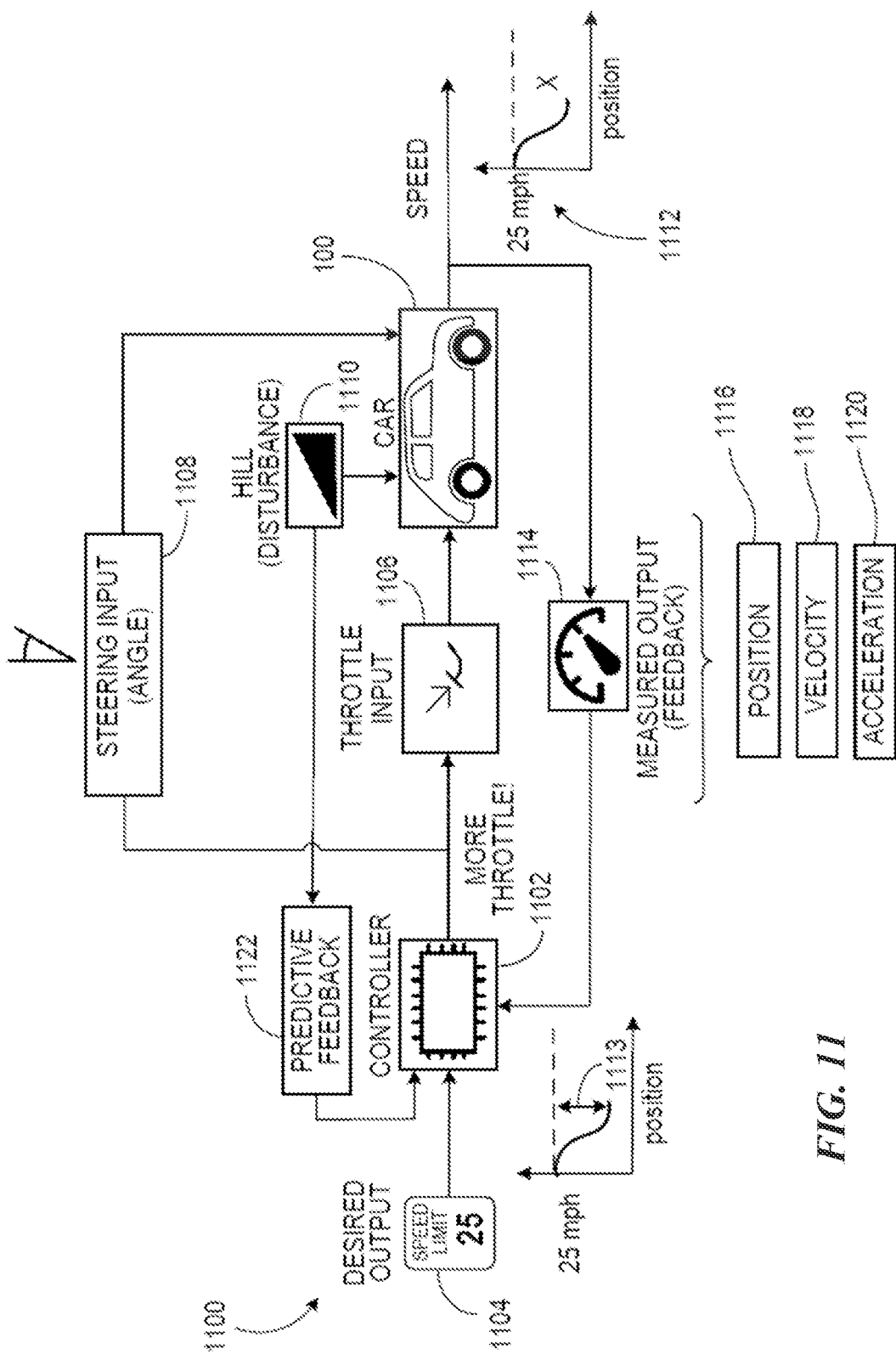
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
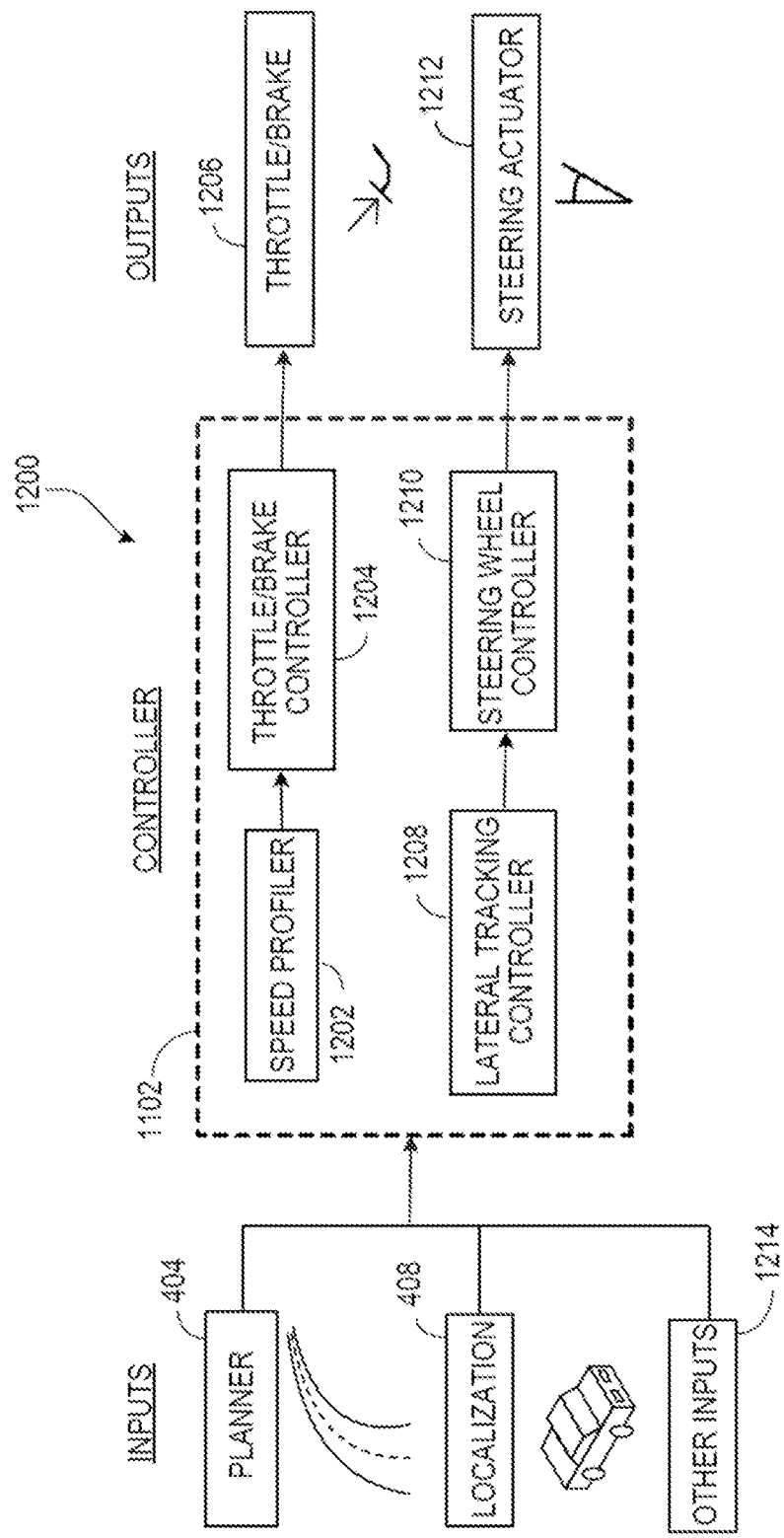
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Traffic Light Detection

Figure 13:
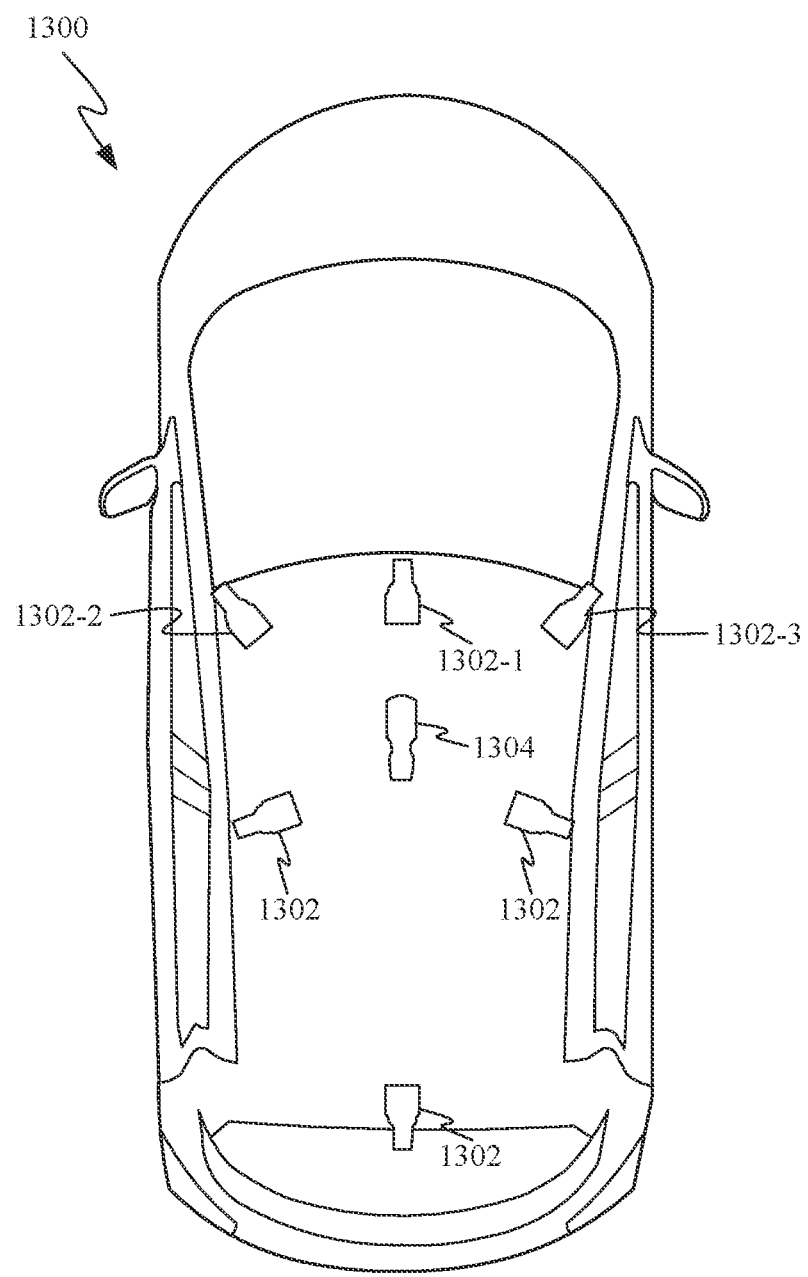
FIG. 13 shows an exemplary autonomous vehicle with a traffic light detection system.

FIG. 13 shows an exemplary autonomous vehicle (AV) 1300 with a traffic light detection system. AV 1300 can be substantially the same as AV 100 described above. AV 1300 includes multiple object detection sensors 1302 distributed around AV 1300 in a circular configuration allowing for 360 coverage and tracking of objects proximate AV 1300. In some embodiments, object detection sensors can take the form of optical sensors configured to determine objects likely to pose a danger to the safe operation of AV 1300. In order to accurately detect and characterize the objects, object detection sensors 1302 have automatic exposure control that allows the optical sensors to adapt to changing lighting conditions so that objects proximate AV 1300 remain clearly in imagery captured by object detection sensors 1302 regardless of the lighting conditions. In other embodiments, one or more of object detection sensors 1302 can be non-imaging sensors such as LiDAR or RADAR sensors. In addition to providing object detection data, one or more of object detection sensors 1302 can provide data for the traffic light detection system.

FIG. 13 also shows traffic light detection sensor 1304 positioned in a central region of a roof of AV 1300. Traffic light detection sensor 1304 can be an imaging sensor and be elevated above object detection sensors 1302 to avoid a situation in which object detection sensors block a field of view of traffic light detection sensor 1304. Traffic light detection sensor 1304 can be elevated by a support structure or simply a curvature of a roof of AV 1300. For example, a roof-top having a convex shape naturally places object detection sensor 1304 above the other object detection sensors. This is particularly important for preventing object detection sensor 1302-1 from obscuring a field of view of traffic light detection sensor 1304. While it is noted that only a traffic light detection sensor is shown, it should be appreciated that other traffic light detection sensors are also possible. For example, two object detection sensors could be mounted side by side to provide stereoscopic imaging of light emitted by the traffic signals.

Traffic light detection sensor 1304 can be specially attuned for detecting an amount of light emitted by a traffic light. For example, a shutter speed, aperture and ISO of the traffic light detection sensor 1304 can be set to achieve a desired exposure level tuned to help distinguish a size and color of the light emitted by the traffic light. While the traffic light will be generally referred to as a signal often having only red, yellow and green circles, the term traffic light can be broader and should be construed generally to mean any light emitting signal configured to convey driving information to an autonomous vehicle. By tuning the traffic light detection sensor to the amount of light typically emitted by a traffic signal, other objects in the field of view of imagery detected by traffic light detection sensor 1304 may be overly bright or dark. This can prevent the imagery from clearly showing whether the emitted light is coming from a traffic light or a vehicle. Object detection sensor 1302-1, which is aligned with traffic light detection sensor 1304 can share a very similar field of view depending on the focal length of the optics associated with each sensor. When the fields of view are similar this allows imagery generated by object detection sensor 1302-1 to supplement the imagery gathered by traffic detection sensor 1304. When a field of view of traffic light detection sensor 1304 is much wider than object detection sensor 1302-1, lateral portions of the imagery collected by traffic light detection sensor 1304 can be supplemented by object detection sensors 1302-2 and 1302-3.

Supplementing the imagery data can be done in various ways. For example, images can be combined to create high dynamic range (HDR) imagery that clearly shows both the features of the traffic signal and the light being emitted by the traffic signal. In other embodiments, analysis can be run sequentially from the two sensors. In some embodiments, the light detected from the imagery generated by the traffic light detection sensor is analyzed after which the imagery from object detection sensor 1302-1 can be used to determine whether or not each detected light is being emitted from an object that at least resembles a traffic light. In this way, the imagery from the object detection sensor can be used to reject light detections that might otherwise be confused for a traffic light were the traffic light detection system solely dependent upon traffic light detection sensor 1304.

Figure 14A:
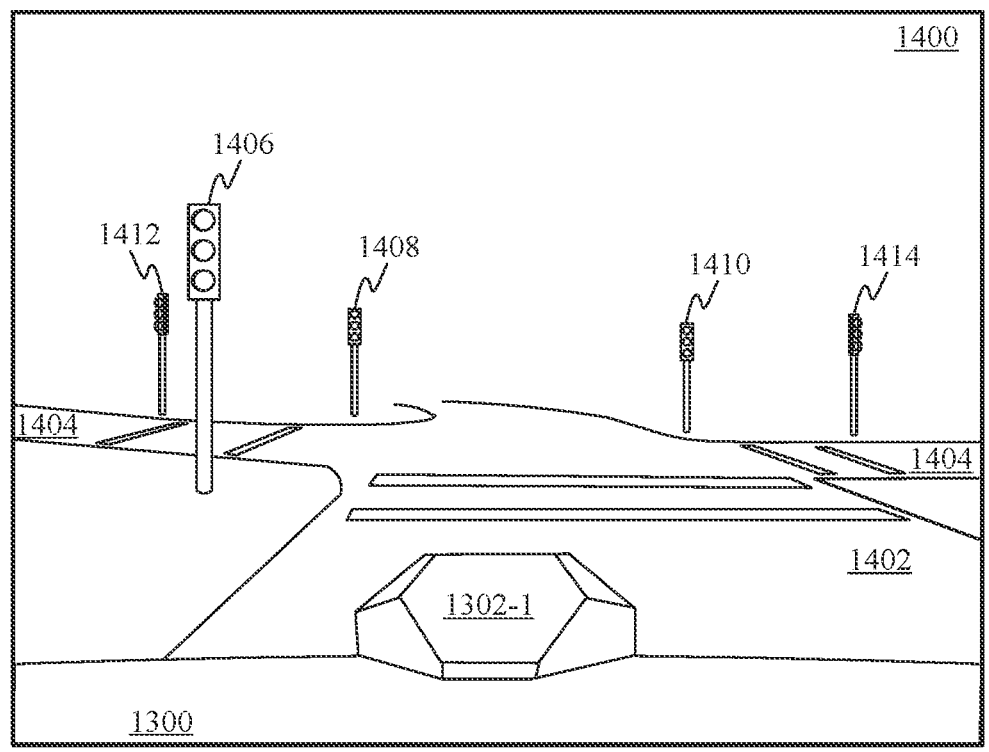
FIG. 14A shows an exemplary image captured by a traffic light detections sensor as an autonomous vehicle approaches an intersection.

FIG. 14A shows an exemplary image 1400 captured by traffic light detections sensor 1304 as AV 1300 approaches an intersection of street 1402 and street 1404. Object detection sensor 1302-1 is visible in a lower region of image 1400 and only obscures a small portion of image 1400 that is unlikely to contain a traffic signal. Image 1400 also shows how image 1400 can include a large number of traffic signals not all of which are relevant to autonomous vehicle 1300. As depicted in FIG. 14A, traffic signals 1406, 1408 and 1410 all provide a status of the upcoming intersection for autonomous vehicle 1300. Unfortunately, traffic signals 1408 and 1410, which provide intersection status to vehicles travelling on a cross street 1404, can also be visible and can emit light with a conflicting status. Without any additional cuing or sources of information to supplement what is captured in image 1400, a processor trying to determine a status of the intersection can become easily confused when seeing traffic lights indicating different status.

Figure 14B:
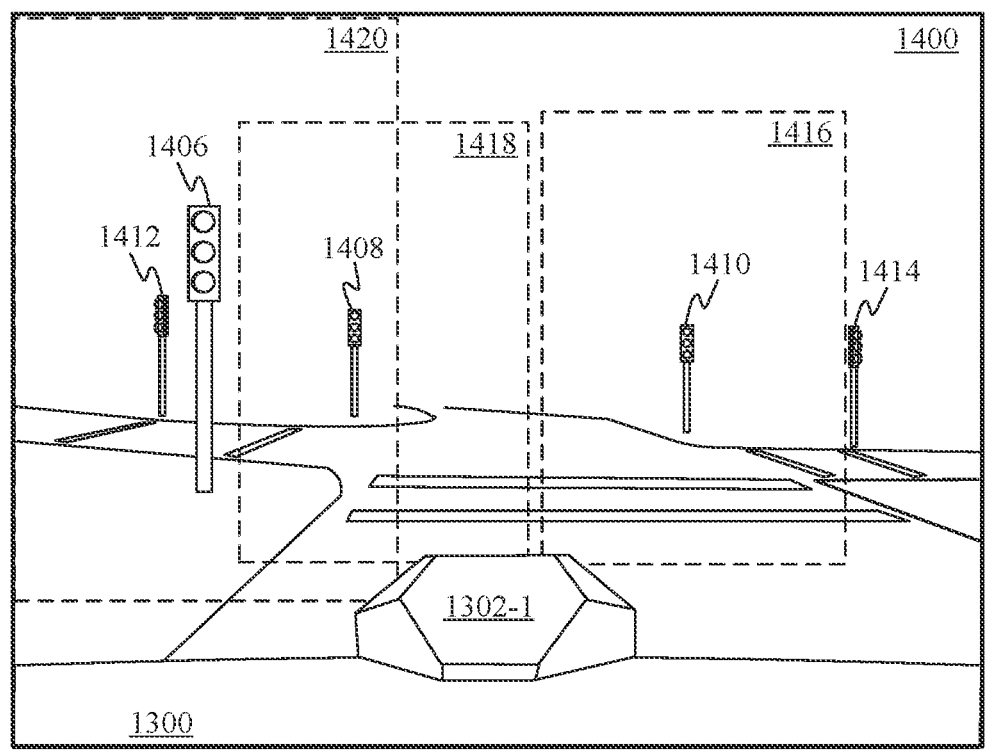
FIG. 14B shows one way in which traffic lights within the image illustrated in FIG. 14A can be distinguished from one another.

FIG. 14B shows one way in which traffic lights within image 1400 can be distinguished from one another. When approaching the intersection of streets 1402 and 1404, a processor, such as processor 146 that is associated with the traffic detection system can be configured to determine a location of each of the traffic signal known to be located at the intersection and relevant to the current direction of travel of autonomous vehicle 1300. This information can be obtained by referencing locally stored or cloud-accessibly map data. Processor 146 is then configured to estimate a location of each of the relevant traffic lights within image 1400 based on the determined location of the traffic lights. Processor 146 also estimates the location of the traffic lights within image 1400 on a location of AV 1300 at the time image 1400 was captured derived from location data provided by a sensor such as sensor 121 (see FIG. 1). When the location data for the traffic lights also includes a height of the status indicia, processor 146 is able to estimate a location of the traffic signal within image 1400. Where no height data is available an average traffic signal height or range of possible heights can be used to help make an accurate estimate. It should be noted that in some embodiments, processor 146 could be configured to obtain traffic signal locations for all lights at the intersection to assist with identifying returns that are not related to the current direction of travel of AV 1300.

Because the estimated location of each traffic signal within image 1400 may be slightly off due to issues such as camera calibration, map data accuracy or the accuracy of position data from sensor 121, processor 146 can be configured to select a portion of image 1400 that is centered around the estimated location and large enough to have a high confidence of including a particular traffic signal. For example, processor 146 has selected first portion 1416 and second portion 1418 of image 1400 within which it has determined respective traffic signal 1410 and 1408 should be located. As depicted, this results in processor 146 eliminating any other traffic signals from the portion of the image it analyzes associated with traffic signals 1408 and 1410. Unfortunately, third portion 1420 of image 1400 includes three different traffic signals. Processor 146 can use many different algorithms to determine which traffic signal is traffic signal 1406 but a primary method is determining which of the traffic signals within third portion 1420 is closest to the center of third portion 1420. In this particular example, since traffic signal 1408 is far off to one side of third portion 1420 it can be eliminated from consideration by processor 1406. Unfortunately, both traffic signal 1412 and 1406 are very close to the center of third portion 1420 so processor 146 may be required to consider additional factors. For example, processor 146 may be able to distinguish the two traffic signals based on the size and/or shape of the light being emitted by each traffic signal. In terms of shape, light emitted by traffic signal 1406 would have a circular pattern whereas light emitted from traffic signal 1412 would have a more elliptical pattern due to it being orientation away from the traffic light detection system. Furthermore, the size of the illumination pattern emitted by traffic signal 1406 would also be larger and closer to an expected illumination pattern size than the light emitted by traffic signal 1412. In this way, the various illumination patterns produced by the five different traffic signals can be distinguished from one another.

Figure 15A:
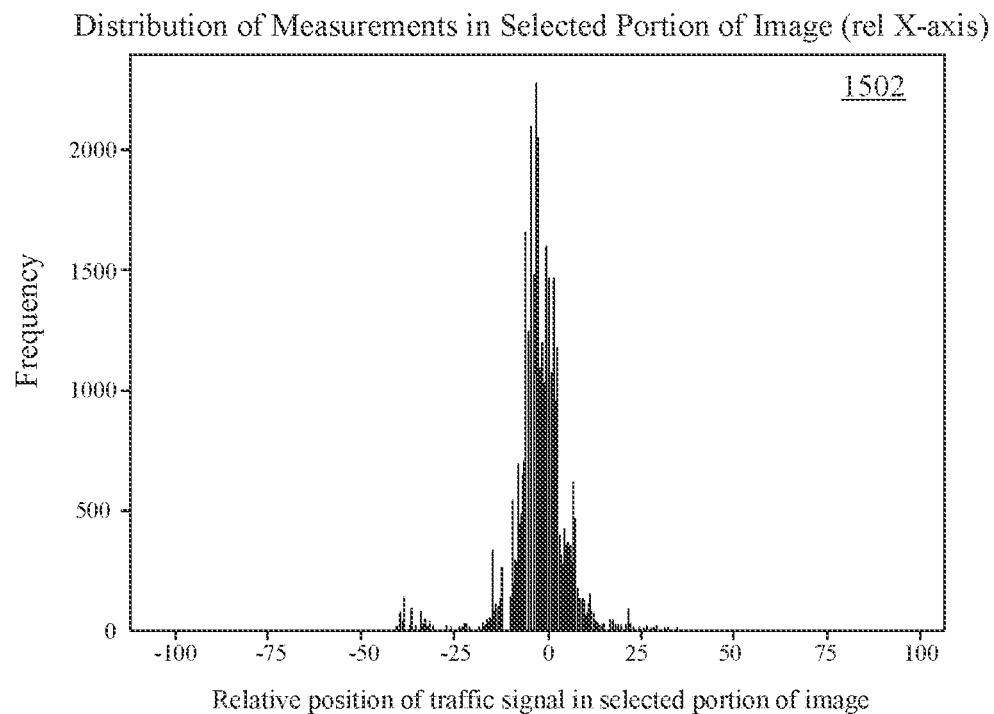
FIGS. 15A-15B show historical data indicating how a detected position of the traffic signal within the selected portion of the image varies differently in the X-axis vs the Y-axis.
Figure 15B:
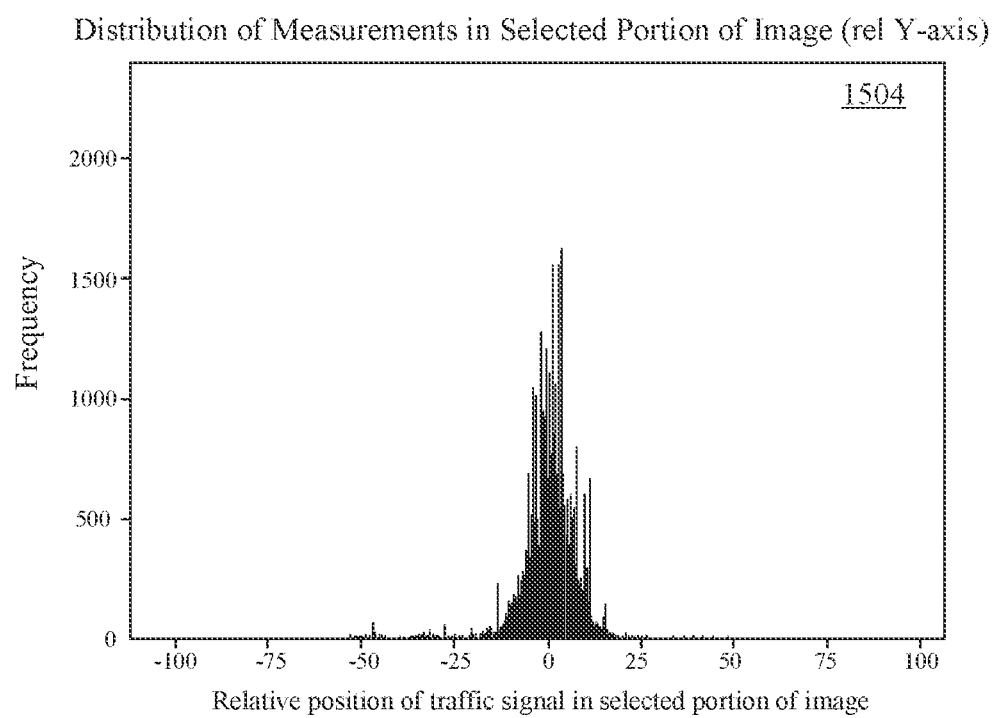

FIGS. 15A-15B show historical data indicating how a detected position of the traffic signal within the selected portion of the image varies differently in the X-axis vs the Y-axis. For this reason, a height of the selected portion, or dashed box as depicted in FIG. 14B, can be different than its width. The position variation depicted in graphs 1502 and 1504 show how the estimated X-axis position tends to be slightly more accurate than the estimated Y-axis position. Possible reasons for the higher variability in the Y-axis include the orientation of most traffic signals being vertical, less accuracy in the height of each traffic signal and camera calibration being less stable in the Y-axis than the X-axis. Regardless of the reason, the position variability data can be used to generate scaling factors that control a size and aspect ratio of the selected portion of the traffic light. Other factors governing the size of the selected portion of the image include a focal length of the optics associated with each sensor and a distance between the imaging sensor and the traffic light. One equation that can be used to dictate the size of the selected portion of the image is given by Equation (1) as follows:

$$\left(S_x * \frac{f_{camera}}{\Delta_{Distance\ to\ TL}}, S_y * \frac{f_{camera}}{\Delta_{Distance\ to\ TL}}\right) \quad \text{Equation (1)}$$

$S_x$ and $S_y$ are scaling factors determined from the historical data, as described above. The variable $f_{camera}$ is a fixed focal length of the sensor and $\Delta_{Distance\ to\ TL}$ is the current distance between the sensor and the traffic light. As can be appreciated from the equation, given that $f_{camera}$ and the scaling value are both constant a size of the box increases as a distance between the sensor and the traffic light decreases. By varying a size of the selected portion with distance, the processor is able to keep a size of the traffic signal relative to a size of the selected portion relatively constant. In some embodiments, this can help a machine learning algorithm being run by processor 146 to perform more effectively as the data being analyzed remains the same but has increasingly high resolution as autonomous vehicle 1300 gets progressively closer to the traffic light.

Figure 16A:
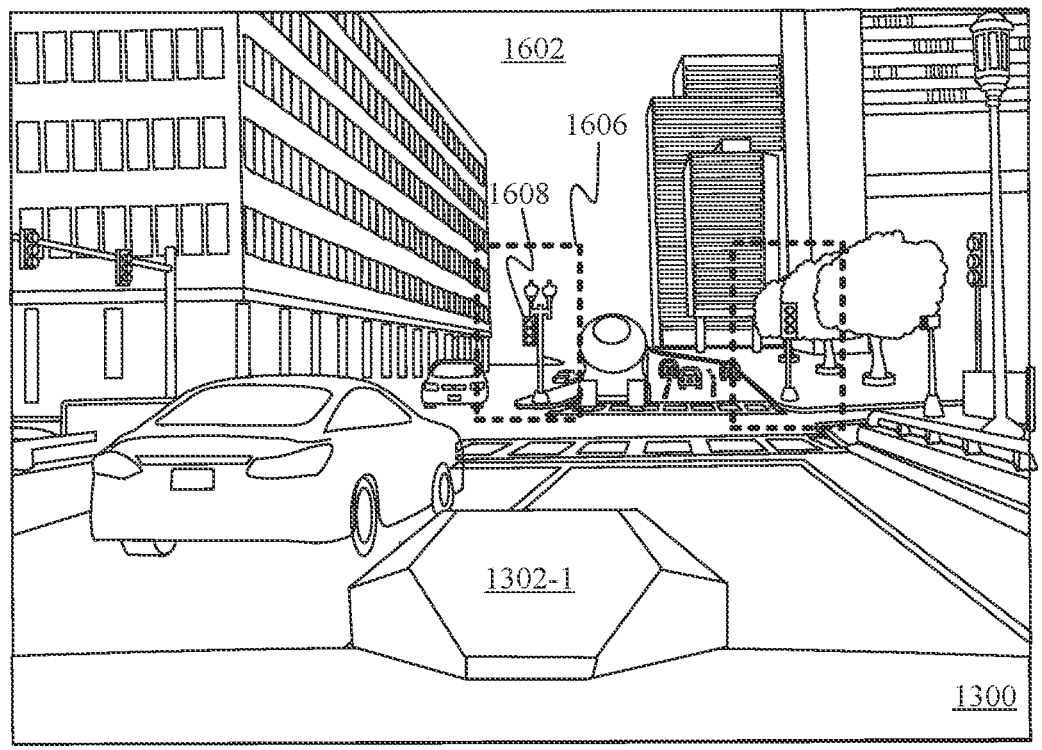
FIGS. 16A-16B show a first image captured at Time $T_1$ and second image captured at Time $T_2$ by a traffic signal detection sensor.
Figure 16B:
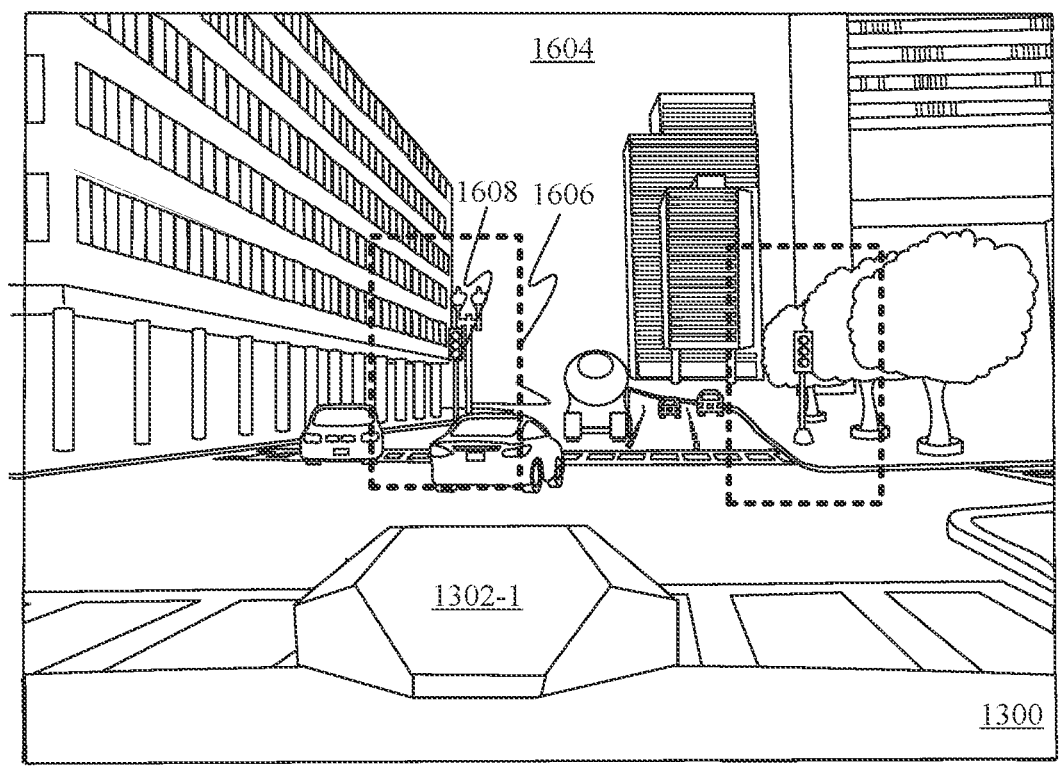

FIGS. 16A-16B show a first image 1602 captured at Time $T_1$ and second image 1604 captured at Time $T_2$ by traffic light detection sensor 1304. In FIG. 16A, selected portion 1606 of first image 1602, which is associated with traffic signal 1608, is depicted noticeably smaller in image 1602 of FIG. 16A than in image 1604 of FIG. 16B. A comparison of the selected portions of images 1602 and 1604 show how the selected portions maintain a consistent size of each traffic signal relative to the selected portion of a captured image. This scaling is consistent with Equation (1) above. It should be noted that a traffic signal status may not be determined as soon as a selected portion is defined. For example, traffic signal 1608 may be too small to detect at a first time in image 1602 and then subsequently become large enough to distinguish its state at a second time from image 1604. It should also be noted that a state of the traffic light may change between successively captured images. In such a scenario, the new status can be confirmed after the new color is determined not to have been caused by obscuration of the sensor or a sudden change in lighting. Such a determination could be made when the new color shows up in a threshold number of images and/or the shade of the colors change has a substantially different hue and/or shape than in previous images. A confidence score associated with this new status can be established more quickly when the sensors being used by the traffic light detection system are able to observe the same change in more than one traffic signal at an intersection.

Figure 17:
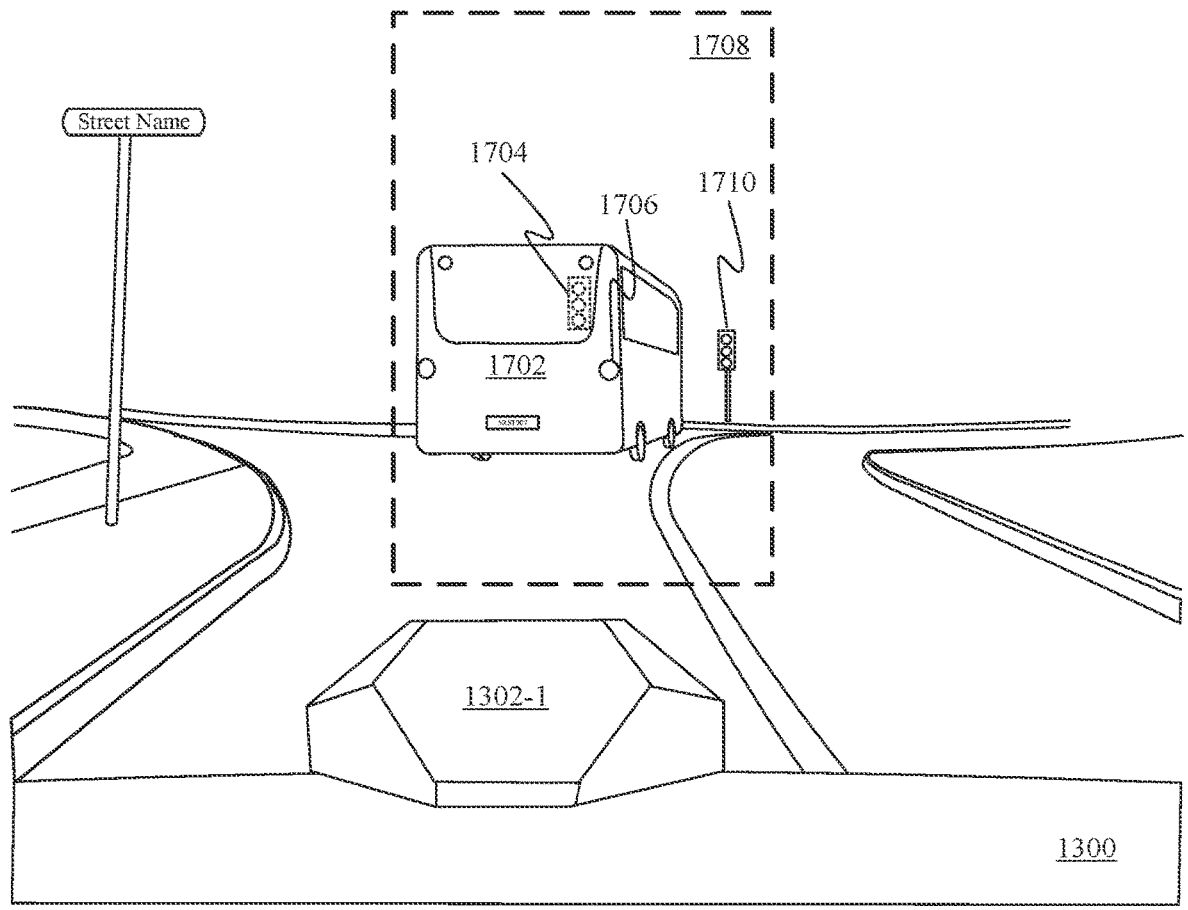
FIG. 17 shows an exemplary scenario in which analyzing imagery from two different types of sensors avoids a mischaracterization of state of a traffic signal.

FIG. 17 shows an exemplary scenario in which analyzing imagery from two different types of sensors avoids a mischaracterization of a state of a traffic signal. In particular, FIG. 17 illustrates a large vehicle in the form of bus 1702 positioned between autonomous vehicle 1300 and traffic signal 1704 that is tall enough to obscure direct line of sight to traffic signal 1704. Traffic signal 1704 is indicated with dashes to show its location while emphasizing its obscured location behind bus 1702. In a low light scenario, relying solely on traffic light detection sensor 1304 could result in a tail light 1706 of bus 1702 being mischaracterized as traffic signal 1704 given a central position of tail light 1706 within selected portion 1708. Without imagery from an object detection sensor having an auto-exposure configuration, imagery captured only by traffic light detection sensor 1304 could be too dark to distinguish a shape of bus 1702 from a shape of traffic signal 1704. In such a single sensor scenario, autonomous vehicle 1300 might stop when it did not need to do so or unnecessarily report a system error if traffic signal 1710 did not match the mischaracterized determination tail light status detected by traffic light detection sensor 1304 of autonomous vehicle 1300.

Figure 18:
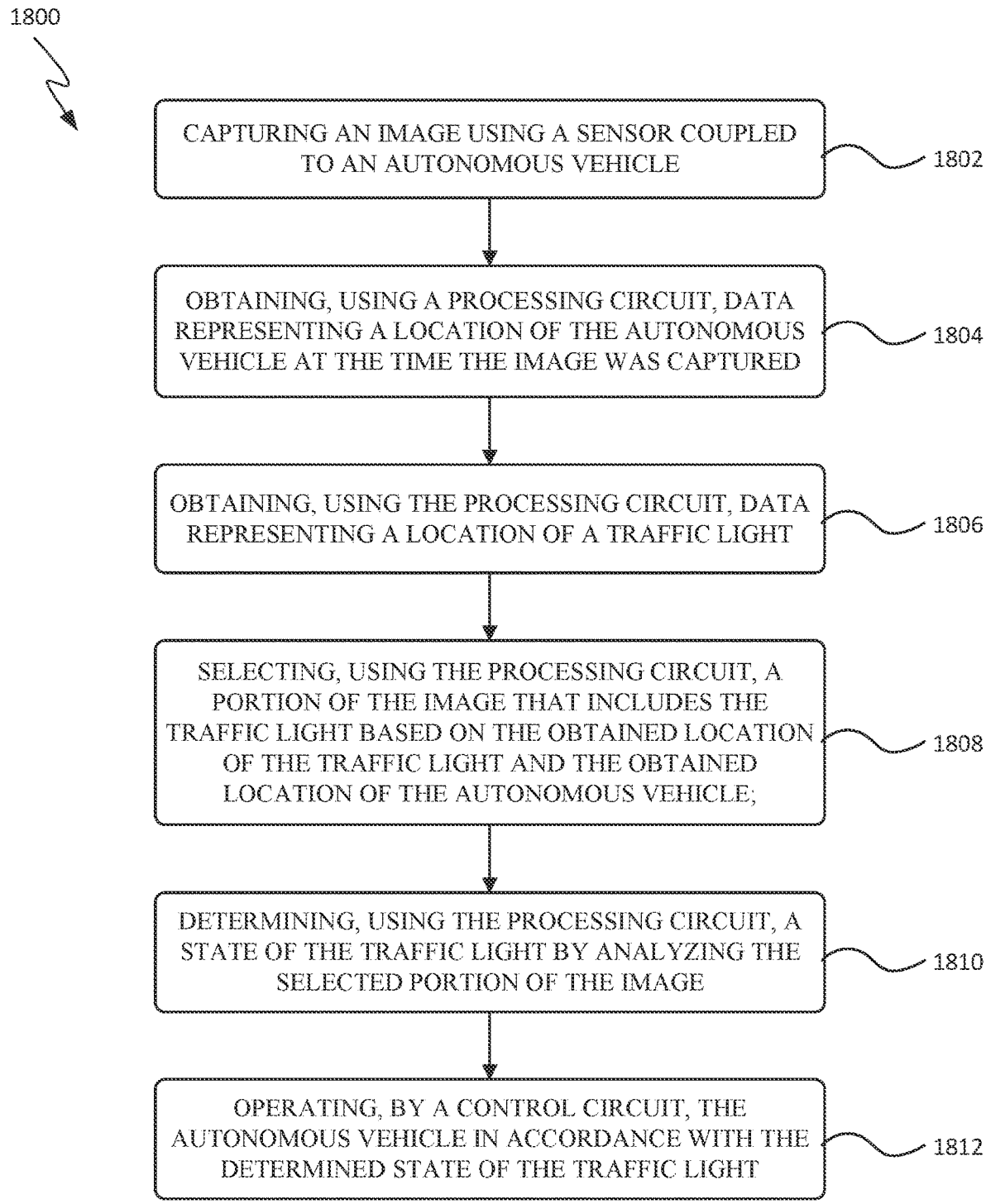
FIG. 18 shows a flow chart depicting a method for traffic light detection and characterization.

FIG. 18 shows a flow chart 1800 depicting a method for traffic light detection and characterization. At 1802, the method includes a sensor coupled to an autonomous vehicle is used to capture an image. At 1804, a processing circuit is used to obtain data (e.g. GPS data) representing a location of the autonomous vehicle at the time the image was captured. At 1806, the processing circuit obtains data representing a location of a traffic light. At 1808, the processing circuit selects a portion of the image that includes the traffic light based on the obtained location of the traffic light and the obtained location of the autonomous vehicle (e.g., the location of the traffic light relative to the location of the autonomous vehicle). At 1810, the processing circuit determines a state of the traffic light by analyzing the selected portion of the image (e.g., without analyzing the non-selected portion of the image to determine a state of a traffic light). Finally, at 1812, a control circuit navigates the autonomous vehicle in accordance with the determined state of the traffic light.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

The following items describe various embodiments covered by this disclosure:

1. A method, comprising:
   capturing an image using a sensor coupled to an autonomous vehicle;
   obtaining, using a processing circuit, data representing a location of the autonomous vehicle at the time the image was captured;
   obtaining, using the processing circuit, data representing a location of a traffic light;
   selecting, using the processing circuit, a portion of the image that includes the traffic light based on the obtained location of the traffic light and the obtained location of the autonomous vehicle;
   determining, using the processing circuit, a state of the traffic light by analyzing the selected portion of the image; and
   operating, by a control circuit, the autonomous vehicle in accordance with the determined state of the traffic light.
2. The method as recited in item 1, further comprising prior to selecting the portion of the image, correlating the obtained location of the traffic light relative to the obtained position of the autonomous vehicle with a location in the image.
3. The method as recited in any of items 1-2, wherein selecting the portion of the image includes determining a size of the selected portion of the image based on a distance between the autonomous vehicle and the traffic light.
4. The method as recited in any of items 1-3, further comprising selecting portions of subsequently captured images based on subsequent locations of the autonomous vehicle relative to the traffic light.
5. The method as recited in any of items 1-4, further comprising:
   selecting a second portion of the image that includes another traffic light; and
   analyzing the second portion of the image to determine a state of the other traffic light,
   wherein operating, by the control circuit, the autonomous vehicle is performed in accordance with the determined state of the traffic light and the determined state of the other traffic light.
6. The method as recited in item 5, further comprising:
   determining whether the state of the traffic light matches the state of the other traffic light.
7. The method as recited in item 1, wherein determining the state of the traffic light includes determining a color and a shape of a light emitted by the traffic light that is positioned within the selected portion of the image.
8. The method as recited in item 7, wherein the determined state of the traffic light is a yellow arrow.
9. The method as recited in item 8, further comprising determining, using the processing circuit, a direction of the arrow by referencing a traffic light database that includes a direction of one or more arrows known to be displayed by the traffic light.
10. The method as recited in any of items 1-7, further comprising determining a confidence of the determined state of the traffic light.
11. The method as recited in item 10, wherein the confidence of the determined state of the traffic light is based at least in part upon an area of the image occupied by the detected light emitted by the traffic light with respect to an expected area of the image occupied by the light emitted by the traffic light.
12. The method as recited in any of items 1-11, wherein the sensor is a first optical sensor and the image is a first image and wherein the method further comprises:
   capturing a second image using a second optical sensor; and
   selecting, using the processing circuit, a portion of the second image that includes the traffic light,
   wherein determining the state of the traffic light includes analyzing the selected portion of the second image.
13. The method as recited in item 12, wherein the first optical sensor is a fixed-exposure sensor and the second optical sensor is an auto-exposure sensor.
14. The method as recited in item 13, wherein operating parameters of the first optical sensor have values well suited for detecting an average amount of illumination emitted by a traffic light.
15. The method as recited in item 1, wherein the image is a first image captured at a first distance from the traffic light and the selected portion of the first image is a first portion and wherein the method further comprises:
   capturing a second image at a second distance from the traffic light, the second distance being shorter than the first distance; and
   selecting a second portion of the second image, the second portion being larger than the first portion such that a first ratio of a height of the traffic signal to a height of the first portion in the first image being about the same as a second ratio of a height of the traffic signal to a height of the second portion in the second image.
16. The method as recited in any of items 1-15, wherein a height of the selected portion of the image is greater than a width of the selected portion of the image.
17. The method as recited in any of items 1-16, wherein a size of the selected portion of the image is based on an estimated accuracy of a predicted location of the traffic light within the image, wherein the estimated accuracy is based on historical data generated from previously captured images.
18. The method as recited in item 17, wherein the height of the selected portion of the image is greater than the width of the selected portion of the image when an estimated accuracy of a vertical location of the traffic light in the image is lower than an estimated accuracy of a horizontal location of the traffic light in the image.
19. One or more non-transitory storage media storing instructions which, when executed by one or more computing devices, cause performance of the method recited in any one of items 1-18.
20. A device, comprising:
   a processing circuit;
   a control circuit; and
   memory storing one or more programs configured to be executed by the circuits, the one or more programs including instructions for performing the method recited in any of items 1-18.
21. An autonomous vehicle, comprising:
   means for capturing an image;
   means for obtaining data representing a location of the autonomous vehicle at the time the image was captured;
   means for obtaining data representing a location of a traffic light;
   means for selecting a portion of the image that includes the traffic light based on the obtained location of the traffic light and the obtained location of the autonomous vehicle;
   means for determining a state of the traffic light by analyzing the selected portion of the image; and
   means for operating the autonomous vehicle in accordance with the determined state of the traffic light.

22. A method, comprising:
  capturing, using a first sensor having a fixed exposure configuration, a first image including a traffic light;
  capturing, using a second sensor having an auto exposure configuration, a second image including the traffic light, the first sensor and the second sensor being coupled to an autonomous vehicle;
  determining, using a processing circuit, a state of the traffic light by analyzing the first image and the second image; and
  operating, using a control circuit, the autonomous vehicle in accordance with the determined state of the traffic light.

23. The method as recited in item 22, wherein operating parameters of the first sensor have fixed values well-suited for detecting an average illumination intensity of the traffic light.

24. The method as recited in any of items 22-23, wherein a first field of view of the first sensor is different than and overlaps with a second field of view of the second sensor.

25. The method as recited in any of items 22-24, wherein a focal length of the first sensor is different than a focal length of the second sensor.

26. The method as recited in any of items 22-25, wherein the second sensor is positioned forward of and below the first sensor relative to the autonomous vehicle.

27. The method as recited in any of items 22-26, further comprising analyzing, using the processing circuit, the second image to identify a moving object.

28. The method as recited in any of items 22-27, wherein operating the autonomous vehicle in accordance with the determined state of the traffic light includes stopping the autonomous vehicle in accordance with the determined state of the traffic light being a red circle or a red arrow.

29. The method as recited in any of items 22-28, further comprising:
  tracking, using the second sensor and a third sensor having an auto exposure configuration, a location of one or more objects.

30. The method as recited in item 29, wherein at least half of a field of view of the second sensor is positioned outside of a field of view of the third sensor.

31. The method as recited in any of items 22-30, further comprising:
  selecting portions of the first and second images that include the traffic light,
  wherein analyzing the first image and the second image includes analyzing only the selected portions of the first and second images.

32. The method as recited in item 31, wherein determining the state of the traffic light further comprises:
  in accordance with a determination that the selected portions of the first and second images include a plurality of lights, determining a light of the plurality of lights to be the traffic light, the determination of which of the plurality of lights is the traffic light being based more on readings from the second sensor than readings from the first sensor.

33. The method as recited in any of items 22-32, wherein determining a state of the traffic light comprises distinguishing a first light emitted by the traffic light from a second light emitted by another light source by referencing an expected location of the first light within the first and second images.

34. The method as recited in item 33, wherein analyzing the first image and the second image comprises analyzing only a first portion of the first image and a second portion of the second image, wherein the first light and the second light are visible in the first portion of the first image and the second portion of the second image.

35. The method as recited in any of items 22-34, wherein the autonomous vehicle comprises a third sensor configured to capture images of traffic lights located outside a field of view of the second sensor, and wherein the processing circuit is configured to use imagery provided by the third sensor to determine a state of the traffic lights captured by the third sensor.

36. The method as recited in any of items 22-35, wherein the first sensor and the second sensor have fixed focus optics.

37. The method as recited in any of items 22-36, wherein the first sensor and the second sensor are digital, visible light video cameras capable of capturing imagery at a rate of at least 24 frames per second.

38. The method as recited in any of claims 22-37, wherein the first sensor and the second sensor are forward facing sensors with fields of view covering an angle of at least 30 degrees centered on a forward end of the autonomous vehicle.

39. The method as recited in any of claims 22-38, wherein the processing circuit includes a neural network that determines the state of the traffic light.

40. A non-transitory computer-readable storage medium storing instructions configured to be executed by one or more circuits of an autonomous vehicle that cause the autonomous vehicle to carry out steps that include:
  capturing, using a first sensor having a fixed exposure configuration, a first image including a traffic light;
  capturing, using a second sensor having an auto exposure configuration, a second image including the traffic light, the first sensor and the second sensor being coupled to an autonomous vehicle;
  determining, using a processing circuit, a state of the traffic light by analyzing the first image and the second image; and
  operating, using a control circuit, the autonomous vehicle in accordance with the determined state of the traffic light.

41. An autonomous vehicle, comprising:
  a first sensor having a fixed exposure configuration
  a second sensor having an auto exposure configuration
  a processing circuit;
  a control circuit; and
  memory storing one or more programs configured to be executed by the circuits of the autonomous vehicle, the one or more programs including instructions for:
    capturing, using the first sensor, a first image including a traffic light;
    capturing, using the second sensor, a second image including the traffic light, the first sensor and the second sensor being coupled to an autonomous vehicle;
    determining, using the processing circuit, a state of the traffic light by analyzing the first image and the second image; and
    operating, using the control circuit, the autonomous vehicle in accordance with the determined state of the traffic light.

42. One or more non-transitory storage media storing instructions which, when executed by one or more computing devices, cause performance of the method recited in any one of items 22-39.

43. A device, comprising:
  a processing circuit; and
  memory storing one or more programs configured to be executed by the processing circuits, the one or more programs including instructions for performing the method recited in any of items 22-39.

44. An autonomous vehicle, comprising:
  means for capturing a first image including a traffic light;
  means for capturing a second image including the traffic light;
  means for determining a state of the traffic light by analyzing the first image and the second image; and
  means for operating, using the control circuit, the autonomous vehicle in accordance with the determined state of the traffic light.

What is claimed is:

1. A method, comprising:
  capturing a first image using a sensor coupled to an autonomous vehicle;
  obtaining, using a processing circuit, a location of the autonomous vehicle at the time the first image was captured;
  obtaining, using the processing circuit, a location of a traffic light;
  selecting, using the processing circuit, a first portion of the first image that includes the traffic light based on the obtained location of the traffic light and the obtained location of the autonomous vehicle;
  determining an orientation of a plurality of traffic lights in the first portion of the first image based on a shape of light emanating from each of the plurality traffic lights;
  identifying the traffic light from the plurality of traffic lights based on the determined orientations;
  determining, using the processing circuit, a first state of the identified traffic light based on the first portion of the first image;
  capturing a second image including the traffic light using the sensor;
  selecting a second portion of the second image, wherein a first ratio of a height of the traffic light in the first image to a height of the first portion of the first image is the same as a second ratio of a height of the traffic light in the second image to a height of the second portion of the second image;
  determining, using the processing circuit, a second state of the identified traffic light based on the second portion of the second image; and
  operating, by a control circuit, the autonomous vehicle in accordance with the first state and the second state of the identified traffic light.

2. The method as recited in claim 1, further comprising prior to selecting the first portion of the first image, correlating the obtained location of the traffic light relative to the obtained location of the autonomous vehicle with a location in the first image.

3. The method as recited in claim 1, wherein selecting the first portion of the first image includes determining a size of the selected first portion of the first image based on a distance between the autonomous vehicle and the traffic light.

4. The method as recited in claim 1, further comprising selecting portions of subsequently captured images based on subsequent locations of the autonomous vehicle relative to the traffic light.

5. The method as recited in claim 1, further comprising:
  selecting a third portion of the first image that includes another traffic light; and
  determining a state of the other traffic light,
  wherein operating, by the control circuit, the autonomous vehicle is performed in accordance with the determined state of the identified traffic light and the determined state of the other traffic light.

6. The method as recited in claim 5, further comprising:
  determining whether the state of the identified traffic light matches the state of the other traffic light.

7. The method as recited in claim 1, wherein determining the state of the identified traffic light includes determining a color of a light emitted by the identified traffic light.

8. The method as recited in claim 7, wherein the determined state of the identified traffic light is a yellow arrow.

9. The method as recited in claim 8, further comprising determining, using the processing circuit, a direction of the arrow by referencing a traffic light database that includes a direction of one or more arrows known to be displayed by the identified traffic light.

10. The method as recited in claim 1, further comprising determining a confidence of the determined state of the identified traffic light.

11. The method as recited in claim 10, wherein the confidence of the determined state of the identified traffic light is based at least in part upon an area of the first image occupied by the light emitted by the identified traffic light with respect to an expected area of the first image occupied by the light emitted by the identified traffic light.

12. The method as recited in claim 1, wherein the sensor is a first optical sensor and wherein the method further comprises:
  capturing a third image using a second optical sensor; and
  selecting, using the processing circuit, a third portion of the third image that includes the traffic light,
  wherein determining the state of the identified traffic light is further based on the selected third portion of the third image.

13. The method as recited in claim 12, wherein the first optical sensor is a fixed-exposure sensor and the second optical sensor is an auto-exposure sensor.

14. The method as recited in claim 13, wherein operating parameters of the first optical sensor have values configured for detecting an average amount of illumination emitted by a traffic light.

15. The method as recited in claim 1, wherein:
  the first image is captured at a first distance from the traffic;
  the second image is captured at a second distance from the traffic light, the second distance being shorter than the first distance; and
  the second portion is larger than the first portion.

16. The method as recited in claim 1, wherein a height of the selected first portion of the first image is greater than a width of the selected first portion of the first image.

17. The method as recited in claim 1, wherein a size of the selected first portion of the first image is based on an estimated accuracy of a predicted location of the traffic light within the first image, wherein the estimated accuracy is based on historical data generated from previously captured images.

18. The method as recited in claim 17, wherein the height of the selected first portion of the first image is greater than the width of the selected first portion of the first image when an estimated accuracy of a vertical location of the traffic light in the first image is lower than an estimated accuracy of a horizontal location of the traffic light in the first image.

19. A non-transitory computer-readable storage medium storing instructions configured to be executed by one or more circuits of an autonomous vehicle that cause the autonomous vehicle to carry out steps that include:
  capturing a first image using a sensor coupled to an autonomous vehicle;

obtaining, using a processing circuit, a location of the autonomous vehicle at the time the first image was captured;
obtaining, using the processing circuit, a location of a traffic light;
selecting, using the processing circuit, a first portion of the first image that includes the traffic light based on the obtained location of the traffic light and the obtained location of the autonomous vehicle;
determining an orientation of a plurality of traffic lights in the first portion of the first image based on a shape of light emanating from each of the plurality traffic lights;
identifying the traffic light from the plurality of traffic lights based on the determined orientations;
determining, using the processing circuit, a first state of the identified traffic light based on the first portion of the first image;
capturing a second image including the traffic light using the sensor;
selecting a second portion of the second image, wherein a first ratio of a height of the traffic light in the first image to a height of the first portion of the first image is the same as a second ratio of a height of the traffic light in the second image to a height of the second portion of the second image;
determining, using the processing circuit, a second state of the identified traffic light based on the second portion of the second image; and
operating, by a control circuit, the autonomous vehicle in accordance with the first state and the second state of the identified traffic light.

20. An autonomous vehicle, comprising:
a sensor;
a processing circuit;
a control circuit; and
memory storing one or more programs configured to be executed by the circuits of the autonomous vehicle that cause the autonomous vehicle to carry out steps that include:
capturing a first image using the sensor;
obtaining, using the processing circuit, a location of the autonomous vehicle at the time the first image was captured;
obtaining, using the processing circuit, a location of a traffic light;
selecting, using the processing circuit, a first portion of the first image that includes the traffic light based on the obtained location of the traffic light and the obtained location of the autonomous vehicle;
determining an orientation of a plurality of traffic lights in the first portion of the first image based on a shape of light emanating from each of the plurality traffic lights;
identifying the traffic light from the plurality of traffic lights based on the determined orientations;
determining, using the processing circuit, a first state of the identified traffic light based on the first portion of the first image;
capturing a second image including the traffic light using the sensor;
selecting a second portion of the second image, wherein a first ratio of a height of the traffic light in the first image to a height of the first portion of the first image is the same as a second ratio of a height of the traffic light in the second image to a height of the second portion of the second image;
determining, using the processing circuit, a second state of the identified traffic light based on the second portion of the second image; and
operating, by the control circuit, the autonomous vehicle in accordance with the first state and the second state of the identified traffic light.

* * * * *